United States Patent [19]
Fisher et al.

[11] Patent Number: 6,038,399
[45] Date of Patent: Mar. 14, 2000

[54] COMPUTER MANUFACTURING ARCHITECTURE WITH TWO DATA-LOADING PROCESSES

[75] Inventors: Jerald C. Fisher, Tomball; Lien Dai Nguyen; James Young, both of Houston; Gunnar P. Seaburg, The Woodlands; Galen W. Hedlund, Tomball; Richard S. Katz, Spring, all of Tex.

[73] Assignee: Compaq Computer Corporation, Houston, Tex.

[21] Appl. No.: 09/070,603

[22] Filed: Apr. 30, 1998

Related U.S. Application Data

[60] Provisional application No. 60/053,455, Jul. 22, 1997.

[51] Int. Cl.[7] ................................................. G06F 9/445
[52] U.S. Cl. .............................................. 395/712; 713/1
[58] Field of Search ..................... 395/200.33, 200.47, 395/200.48, 200.49, 200.5, 200.51, 200.52, 200.53, 200.54, 712, 500; 713/1, 100, 101; 711/113, 114, 156, 162, 168, 173; 714/44, 5, 6, 7, 8; 707/1, 10, 100

[56] References Cited

U.S. PATENT DOCUMENTS

| | | | |
|---|---|---|---|
| 5,388,211 | 2/1995 | Hornbuckle | 395/712 |
| 5,668,995 | 9/1997 | Bhat | 395/674 |
| 5,713,009 | 1/1998 | DeRosa, Jr. et al. | 395/500 |
| 5,717,930 | 2/1998 | Imai et al. | 395/712 |
| 5,727,144 | 3/1998 | Brady et al. | 714/57 |
| 5,745,765 | 4/1998 | Paseman | 395/701 |
| 5,787,491 | 7/1998 | Merkin et al. | 711/173 |
| 5,794,032 | 8/1998 | Leyda | 395/712 |
| 5,794,052 | 8/1999 | Harding | 395/712 |
| 5,809,516 | 9/1998 | Ukai et al. | 711/114 |
| 5,850,539 | 12/1998 | Cook et al. | 395/500 |

OTHER PUBLICATIONS

Bournellis, Cynthia and McAleer, Bernard, "Build–to–Order Program Is Launched by Compaq", Electronic Times, Jul. 14, 1997, 2 pages.

Wall Street Journal, Jul. 10, 1997, Compaq advertisement, 8 pages.

"Innovative Software announces Ghost Software Version 4.0—The NextGeneration in Workstation Cloning", PR NewsWire, Nov. 1997, pp. 1–3.

Usher, "Build–To–Order Priciples can Solve Software–Loading Dilemma", Electronic Buyers News, Mar. 1996, start p. 55.

Primary Examiner—Tariq R. Hafiz
Assistant Examiner—Kakali Chaki
Attorney, Agent, or Firm—Robert Groover

[57] ABSTRACT

A computer manufacturing architecture in which a single software database feeds both direct downloading and surrogate downloading through a common network.

27 Claims, 18 Drawing Sheets

Compaq Hardware

| | Part Number | Description | Serial Number |
|---|---|---|---|
| BASE MODEL | ... 278800-001 | DP 2000 DT 5200 32 MB non-EC... | 6744bk6p9879 |
| HARD DRIVE | ... 294235-B21 | 3.2GB IDE | ... 1000567xxx98 |
| CD-ROM | ... 294181-B21 | 24X IDE CD-ROM Drive | ... 887665444er3 |

New part: Part number: 294172  Serial number: xxx89434

[ < Back ] [ Next > ] [ Cancel ] [ Help ]

*FIG. 7B*

Component Software Selection

| | Part Number | Description | Serial Number |
|---|---|---|---|
| BASE MODEL | ... 278800-001 | DP 2000 DT 5200 32 MB non-EC... | 6744bk6p9879 |
| HARD DRIVE | ... 294235-B21 | 3.2GB IDE | ... 1000567xxx98 |
| CD-ROM | ... 294181-B21 | 24X IDE CD-ROM Drive | ... 887665444er3 |

Language: English US

Operating System: WINDOWS 95 SR2

Applications:

[ < Back ] [ Next > ] [ Cancel ] [ Help ]

*FIG. 7C*

COMPUTER MANUFACTURING ARCHITECTURE WITH TWO DATA-LOADING PROCESSES

CROSS-REFERENCE TO RELATED APPLICATIONS

This application claims priority from Provisional application Ser. No. 60/053,455 filed Jul. 22, 1997, which is hereby incorporated by reference. However, the content of the present application is not identical to that of the priority application.

BACKGROUND AND SUMMARY OF THE INVENTION

The present application relates to computer manufacturing, and particularly to the installation of software releases at remote computer manufacturing or test facilities.

Background: Software Installation

Software installation is normally a burden with new computers, and is often a source of frustration for consumers. Thus, pre-installation of software by the computer manufacturer is very welcome to consumers. Pre-installation also helps to avoid problems which might be caused by software incompatibilities or incorrect installation of software. Pre-installation of software also helps to avoid unnecessary service calls to the computer manufacturer which may be due to the consumer's difficulty in understanding the software installation instructions.

Software Management

Pre-installation of software to prevent incompatibilities or incorrect installation at the consumer level requires careful software management. This management takes place not only prior to but also during the manufacturing process.

Traditionally, pre-installation is accomplished through creation of disk images. A disk image is a file that holds a copy of all of the data, including partitioning and driver information, contained on a given storage medium (usually a hard disk drive). Disk images are usually prepared by a software engineering group once a personal computer has been configured with all of the appropriate components (operating system, applications, utilities, TSRs, etc.). This configured computer is referred to as a "master". The disk images themselves are then replicated and distributed to remote manufacturing sites for installation on consumer machines.

Configuration and installation takes place prior to packing the unit for shipping in order to provide the consumer with a unit that is operable ("ready to run") upon receipt. Configuration of the unit encompasses partitioning the unit's hard drive, setting up boot information, and adding file directory structure information. Installation is the process of writing the physical software files to the hard drive.

Background: Zip Deliverables

The role of a software distribution system is to facilitate the transfer of software, which is to be released to the consumer, to the manufacturing site. Once at the manufacturing site, the software will be installed and configured on a raw (unformatted) hard drive or the hard drive of a newly assembled personal computer.

Current distribution techniques depend on a batch delivery system. The batch is composed of a disk image (namely, the set of files released for installation consisting of all required components) which has been compressed into a single deliverable unit. Compression is a process by which the disk image is condensed in order to take up less storage space. Such a unit is often referred to as a "zip deliverable", which is a reference to the compression utility, PKZIP™, most often used to create the compressed file deliverable.

Currently, zip deliverables are distributed in what is known as the drop method, that is, when any change is made to just one of the files constituting the zip deliverable, the entire deliverable must be rebuilt and redistributed (dropped) to the manufacturing site. Such a distribution method puts an even greater demand on transmission capabilities, since all rebuilt deliverables will need to be redistributed to the manufacturing facilities in a relatively short period of time. Without prompt updates, the manufacturer has to allocate greater resources to post-consumer fixes.

Background: Disk Image Disadvantages

The use of disk images for distribution of software has inherent disadvantages. First, the size of disk images needed to distribute complete system software configurations has grown almost exponentially in the past 10 years, from 30 megabytes to over 400 megabytes, due to the increased hard disk space requirements of more functional operating systems and feature-rich applications. Consequently, the storage media for the disk image must meet ever increasing capacity demands and distribution costs continue to rise.

Second, disk images are limited to one configuration. Changes in disk image configuration can result from any difference in hardware and software combinations. For each change in configuration, no matter how slight, an entirely new disk image must be built, replicated, and distributed. Most installation configurations tend to have one or more files in common, such as the operating system or user applications. This results in many files being duplicated and distributed multiple times. Large amounts of hardware storage space are required to store these common files multiple times, once for each minor difference in configuration.

Creating an installation configuration for each possible combination of software and hardware would be time consuming and demand an extraordinary amount of hardware storage space. Assumptions must therefore be made as to what hardware and software configurations will be requested by the customer, and these configurations built accordingly. Therefore, any machine that is tailored for a specific customer must either have a disk image created for it or have some software installed at pre-installation independently of the disk image. As discussed above, creating a disk image for each configuration would increase costs in terms of both time and storage space.

The alternative of installing more software after a disk image has been installed can also create problems. Software installed outside of a disk image may not be fully compatible with that installed from a disk image. This defeats one of the purposes of a disk image, which is to ensure that all of the software it includes functions properly together. Further, installing software outside of a disk image increases the amount of time required to produce a hard drive or computer that is ready to be shipped. Finally, installing software outside of a disk image can impact customer service responses. When non-standard software is installed, problems can arise that will not be familiar to customer services representatives. Their efforts to resolve the problems may take a longer amount of time or be unsuccessful altogether.

Without maintaining an "as-installed" character, the system cannot be guaranteed to function properly and diagnosis of any problems may become difficult. Further, by installing software outside of a zip deliverable package, the time advantage of a single installation process is lost.

Third, disk images cannot be updated. Once a disk image is built, it cannot be modified. Components that comprise disk images may need to be changed because of a software bug fix or new revision. If a component is changed, each disk image incorporating that component must be rebuilt, replicated, and distributed.

Fourth, in addition to greater demands on storage space, the amount of time to distribute multiple disk images has greatly increased. With each different configuration, time must be taken to create its disk image. The disk image must then be distributed. The increase in the size of the disk image, even if the distribution system is computer network based, has a corresponding effect on the disk image transmission time. As the number of different computer configurations grows, improved transmission capability in terms of both speed and accuracy is required. Both speed and accuracy factor into maintaining efficient distribution of software to computer manufacturing facilities. Minimizing distribution time for disk images can be critical when updates to components have occurred to fix software bugs. The faster the disk image can be propagated to the installation site, the fewer the number of computers released with faulty software.

Finally, zip deliverables have the inherent disadvantage of a lack of security. During the distribution process, the media which contain the software may not be within the control of the manufacturer. If the zip deliverables are distributed via a common carrier, they could be misplaced or stolen. Because the zip deliverable is merely a compressed version of a configured software install, there is some risk that it could be used by anyone with the proper hardware and software to install or upgrade software on their own machine or the machines of others. Further, there is some risk that an intercepted zip deliverable could be imperceptibly altered to remove or add data (including viruses) and then sent on to the remote manufacturing facility.

Remote manufacturing facilities are not necessarily under the control of the manufacturing headquarters. In fact, some remote manufacturing facilities may be responsible for the assembly and configuration of machines from many different computer manufacturers. The zip deliverables themselves may contain the proprietary software of a particular company. Therefore, security of pre-installation software configurations is important within the remote manufacturing facility. A further concern, even at the remote manufacturing facility, is that the zip deliverables, due to their small size and ready mobility, could become misappropriated.

Background: Computer Manufacturing Constraints

Mass-manufacturing of mid-market or high-end personal computers faces some difficult constraints: software must be released from a software engineering group and distributed to a computer manufacturing facility without alterations that would change the configuration for a particular machine. The complete hardware and software configuration must be carefully controlled, to avoid substitutions which introduce incompatibilities; the distribution process must be efficient in order to reduce the amount of information that is distributed; and revised system configurations must be manufactured and shipped very quickly in order to reduce the number of computers which leave the factory without the most current version of released software.

A further important constraint is time-to-market. The ability to meet consumer demands quickly, and provide the newest features as soon as possible, is crucial. Thus, the software pre-installation process must not be too rigid. It must remain in a state that allows new configurations and combinations of existing configurations to be integrated quickly and easily to satisfy changing customer demands.

Background: Datablasting

Current software pre-installation methods utilize datablasting to write a particular software configuration onto a raw hard drive. With datablasting, drive partition information, the "MBR" (master boot record), the "FAT" (file allocation table), and the software to be installed are all written to the drive with one write command. Datablasting essentially copies the contents of one drive to another drive. In its basic form, datablasting occurs on only one drive at a time (since it is basically a disk copy operation). It has the advantage of allowing a hard drive to be prepared for delivery quickly. However, datablasting is not a flexible tool for software installation. Datablasting requires that the drive partition information, the MBR, the FAT, and the software to be installed be predetermined. This determination is not made at the factory but by the group releasing the software for installation. Therefore, datablasting must rely on the zip deliverables described above.

Channel Configuration Program Data-loading Process

The present application discloses a system of software installation in computer manufacturing which manages the installation of software which has been released by a software engineering group onto raw hard drives or assembled computers at a remote manufacturing facility. The disclosed installation system seeks to overcome the deficiencies of present software installation systems. In overcoming these deficiencies, the installation system disclosed contains several innovative features.

One of the innovative features disclosed is the ability to install software onto both raw hard drives and assembled computers on the same network (surrogate and direct downloading). With this ability the amount of installation hardware needed at the manufacturing facility can be reduced. Having this ability also allows the use of a single process to direct the installation of software.

Another of the innovative features disclosed is the ability to install software onto multiple raw hard drives at the same time (multiple surrogate downloads). With this ability, the amount of installation hardware needed at the manufacturing facility can be reduced. Further, the time required to prepare multiple raw drives with the same data can be reduced substantially.

Another of the innovative features disclosed is the use of database structures which support the installation of software which has been released by a software engineering group as individual files or as a SKU/BOM disk image. The use of a database to support installation of released software allows PCs and raw hard drives to be configured to order (CTO) regardless of the SKU/BOM relationships created by a software engineering group.

Surrogate and Direct Data-loading

The software distribution system of the presently preferred embodiment has the ability to install software onto both raw hard drives (surrogate downloading) and assembled computers (direct downloading) on the same network. The downloading architecture at the manufacturing facility allows machines containing raw hard drives (surrogates) to be connected to a local area network (LAN). Also on the LAN is a server containing all of the SKU/BOM combinations that are available for download (the "PRISM" server). The PRISM server has access to a server containing the software configuration to be installed on the raw drive (the "SFDM" server). The downloading architecture also allows assembled computers (PCs) to be connected to the LAN and obtain access to the same set of information.

The process which initiates and manages software downloading is executed from either the assembled PC or the surrogate machine. The process automatically detects whether it is downloading software onto a raw hard drive or onto the hard drive of an assembled computer. Based on the serial number of the hard drive or assembled unit, a configuration list of the software to be downloaded is obtained from the SFDM server. This list, in SKU/BOM part number form, is used by the download process to retrieve the physical files to be installed, including partition information, MBR, and software data files. In the case of an assembled unit, further diagnostics can be loaded and run to check the installation of both the hardware and software. Unlike current datablasting techniques which connect a raw drive to a data source without the aid of a surrogate machine, in the presently preferred embodiment, the raw hard drive is connected to a LAN just as the assembled units. Therefore, the LAN can provide data to both the surrogate and assembled units in the same manner.

Multiple Surrogate Data-loading

Another of the innovative features disclosed in a preferred implementation is the capability to install software onto multiple raw hard drives at the same time. In a contemplated best mode, the surrogate machine connected to a LAN, described above, can be configured with multiple drive bays, enabling it to receive multiple raw hard drives. If the surrogate machine is configured with a multitasking environment, such as Windows NT™, the software configuration data received over the LAN can be installed on any or all of the drives present in the surrogate machine. This particular feature greatly reduces production time for large orders of drives, each with the same software configuration requirements. Further, it allows for a reduction in the number of surrogate machines required in the manufacturing facility.

Configure to Order

Another of the innovative features disclosed is the use of database structures and a software selection process which support the installation of software which has been released by a software engineering group as individual files or as a SKU/BOM disk image. These structures allow software for installation to be selected as packages, or groups of files, and individual files.

A set of configuration rules associated with each selection ensures that the selections are compatible with each other and that all of the necessary supporting software for a particular selection is installed. The configuration rules consist of requirements for hardware, operating system, language, and other supporting software which must be installed to support the selected software. The configuration rules can also maintain a record of known incompatibilities. The software selection process is responsible for seeing that these requirements are met and the known incompatibilities avoided for each software selection. By enforcing configuration rules for each selection, the problem of incompatibility between hardware and software, and incompatibility between installed software packages is eliminated. Therefore, it is no longer necessary to rely on "as-installed" complete packages from a software engineering group. Instead, the software engineering group can release smaller groups of files, or individual files as they should be installed.

In turn, the pre-installation of software can take place without being tied to a zip deliverable. The database structures can manage the distribution and installation of individual file releases and releases of files that are logically grouped together (SKU/BOM).

Advantages

The advantages of the various disclosed innovations in the optimized installation model are numerous. One advantage of the various innovations is reduced installation time as both surrogate (including multiple drive) and direct downloading can take place from the same dataset on the server.

Another advantage is reduced pre-installation cost, since software can be directly installed onto the hard drives of assembled units, eliminating the need for some surrogate machines. This results in a reduction in the amount of hardware (surrogate machines and network architecture) required at the manufacturing facility. Further, separate disk images for each minor configuration change will not have to be produced and distributed, any configuration needed can be created via the software selection process.

Another advantage is more efficient updating: Updates can be released at any time, without the need to rebuild multiple disk images and without the delay usually associated with their distribution.

Another advantage of the disclosed innovations is the ability to meet consumer demands of built to order PCs with configured to order software pre-installed. This results in delivery of a reliable custom product in a very short period of time. Of course, it will frequently be necessary to build a single configuration repeatedly.

Another advantage of the preferred system is its ability to respond efficiently to large orders of similar configurations. The multiple surrogate download process can be used at the computer manufacturing facility to create the same software configuration across several hard drives in the time formerly taken to create one.

BRIEF DESCRIPTION OF THE DRAWINGS

The disclosed inventions will be described with reference to the accompanying drawings, which show important sample embodiments of the invention and which are incorporated in the specification hereof by reference, wherein:

FIGS. 7A–C depict input windows for hardware and software component selection.

DETAILED DESCRIPTION OF THE PREFERRED EMBODIMENTS

Figure 1:
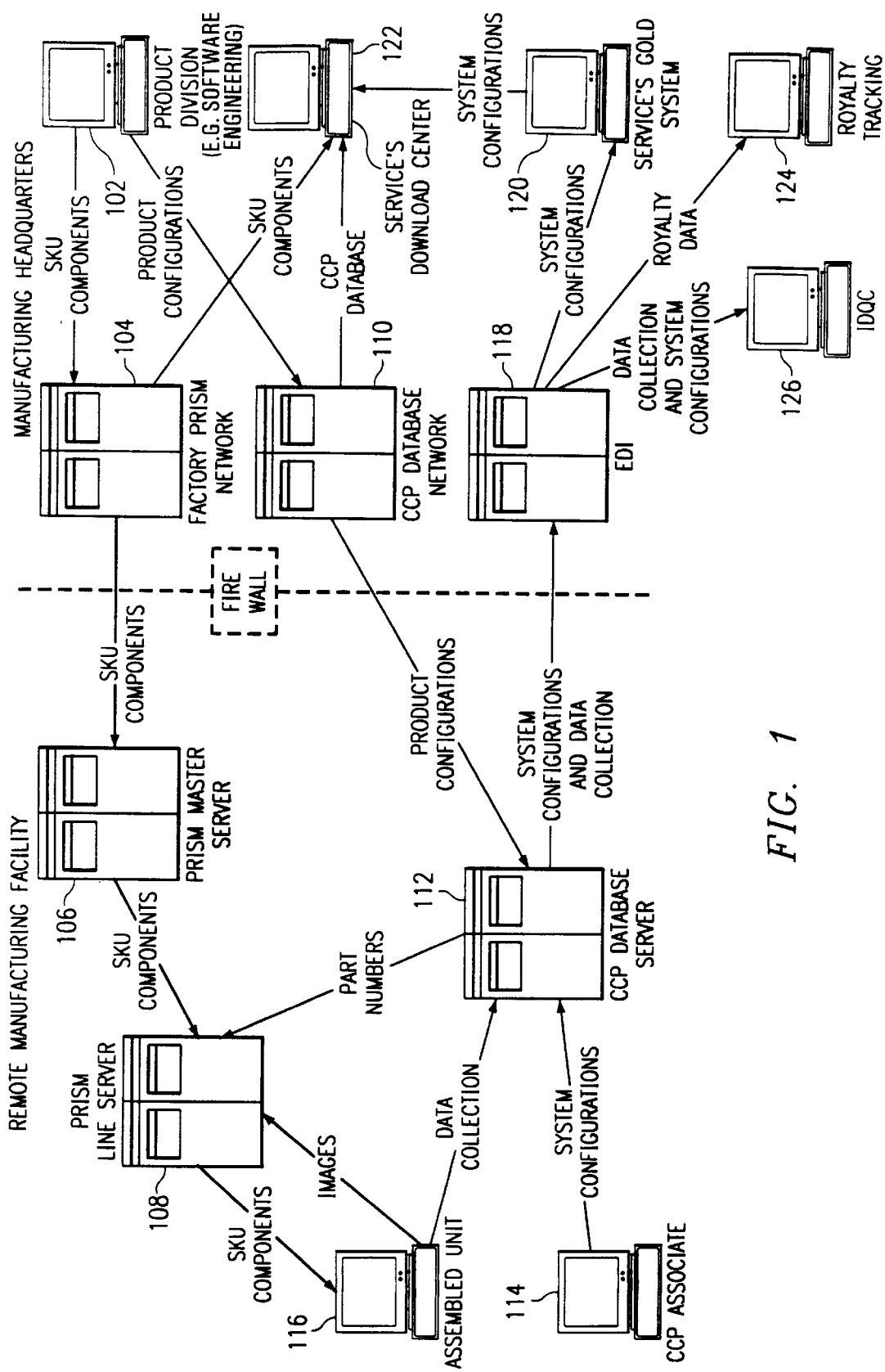
FIG. 1 shows a block diagram of the data flows between and within a remote manufacturing facility and manufacturing headquarters.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The present application has drawings in common with and hereby incorporates by reference the following commonly-owned applications:

Ser. No. 09/070,589, filed Apr. 30, 1998;
Ser. No. 09/070,431, filed Apr. 30, 1998; and
Ser. No. 09/002,152, filed Dec. 31, 1997 (Atty's No. P-1721).

As software applications to run and support personal computers continue to become more functional and feature-rich, the disk space required by applications continues to grow. This directly affects the distribution systems used to deliver software configurations to be installed prior to consumer sale. As the number and size of different configurations grows, the system must be updated to continue to provide an effective distribution and installation mechanism.

A system of software distribution and installation that incorporates management of data and software configuration rules via a database, such as the one described in the present application overcomes many of the difficulties in the present software distribution system. Further, it allows minimization of storage requirements at the computer manufacturing sites while maximizing the flexibility of software configurations that can be installed.

Utilizing this distribution architecture, multiple software engineering groups may release software to be installed in various personal computers with a minimum of cross-departmental coordination. The released software is maintained in the distribution system until it is installed on a personal computer at the remote manufacturing site. Installation at the manufacturing site instead of relying on the consumer for installation ensures proper configuration of the machine and minimizes the overhead of customer support.

Definitions

Assembled Unit: The computer system that is built from the manufacturer's hardware and software components. Third-party hardware and software may be added after the manufacturer's system is built.

Attributes: Each entity may have properties that stores information about the entity. These properties are called the attributes of an entity.

BLOb ("Binary Large Object"): A data type which can be stored in a database as a non-fixed length record. Typically used in storage of text or various kinds of binary images.

BOM ("Bill-of-Materials"): In this document, BOM refers to a software bill-of-materials. A BOM is associated with a list of compressed and/or non-compressed software files that are copied to a computer during software pre-installation.

CCP: Channel Configuration Program

CCP Assembly Cell: A physical location where computer systems are assembled.

CCP Associate: The individual responsible for assembling a computer system in the CCP Cell.

CCP Client Program: The database collection and software configuration program that executes on the CCP Client Station CCP Client Workstation: The system that is connected to the CCP database and is used for data capture and software configuration in the CCP Cell.

CCP Download Control Program: A program that executes in the assembled unit at software download time.

CCP Download diskette: The diskette that contains programs used for software download. This diskette is used on the assembled unit.

CCP Server Control Program: The CCP Server Control Program (SCP) provides an interface that is a functional replacement for the Shop Floor Data Management (SFDM) system in a manufacturing facility.

COA: Certificate of Authenticity.

CTO: Configure-to-Order: Systems built and configured upon receipt of a customer order.

DBMS ("Data Base Management System"): A product that supports the reliable storage of the database, implements the structures for maintaining relationships and constraints, and offers storage and retrieval services to users.

DSD: PRISM Surrogate Download System is a tool to place software on a target drive that is already installed in the target unit.

Entity: Entities can be defined as any person, place, thing, event, or concept about which information is kept. Nouns, like "car", "computer" or "desk" usually name entities ERD ("Entity Relationship Diagram"): A graphical representation of the relationship present in a relational database.

FAT ("File Allocation Table"): The information used by operating system software to manage files on a hard disk.

FIST ("Factory Isolation Standard Tables"): The main software interface by which all installation data preferably flows into the factory.

FUN ("Functional Normalization"): A process of elimination of duplicate files between divisions.

GEMINI: An image builder/data blaster download tool for both surrogate and direct downloading.

Line Server: A file server which serves at least one assembly line for installation of files on the hard disks of assembled computers. In the system behind FIST, the line server becomes mainly a host for a DBMS-based storage of the files to be installed.

Local PRISM Server: A server located at the CCP site that is not on the Factory PRISM Network. Images created locally are stored in the system.

MBR ("Master Boot Record"): The MBR contains minimal operating system code to load the boot sector of the partition marked as startable (or bootable), and the description of the partitions located on the hard disk.

Master Server: A file server with massive storage resources is used as the central repository for all installable files in a manufacturing facility. In the system behind FIST it becomes mainly a host for a DBMS-based storage of the files to be distributed to line servers in each factory.

PRISM ("Preinstall Reengineering Initiative for Software Management"): The factory system responsible for putting software on manufactured systems.

PRISM Line Server: A server located at the CCP site that is not on the PRISM Factory Network. Images created locally are stored in the system.

Replication: A feature of SQL Server 6.x (and many other DBMSs) which is being exploited by FIST to improve file transmission system between a headquarters site and the factories. It allows all or just certain records to be copied under certain criteria to other databases using a 'Publish and Subscribe' metaphor where one database is the publisher and all subscribers get data copied to them from the publisher.

SFDM: Shop Floor Data Management System

SKU ("Stock Keeping Unit"): A SKU is created from the part number. The description identifies the CPU, the primary hard disk, the country/keyboard and whether or not software will be pre-installed in the factory during manufacture.

Software Part Number: A standard 6-3 part number with a Material Description Code of 1005 (BTO\CTO Software).

SQL ("Structured Query Language"): A language method of accessing and maintaining a database. Also used to refer to the database itself that uses this type of language.

User: A person who operates the surrogate or direct download system.

UUT: Unit Under Test—The system currently undergoing test.

SUMMARY OVERVIEW

The preferred embodiment discloses a system of software installation which provides for both surrogate and direct downloading of data. The system also provides for the installation of software at remote manufacturing sites "as released" by software engineering groups while allowing file by file update of individual software components.

Software released for installation by a software engineering group is placed into a database and given a unique identifier. The software is then distributed to individual databases at computer manufacturing facilities. The software is then installed on either raw hard drives or assembled PCs for consumer use.

Figure 1A:
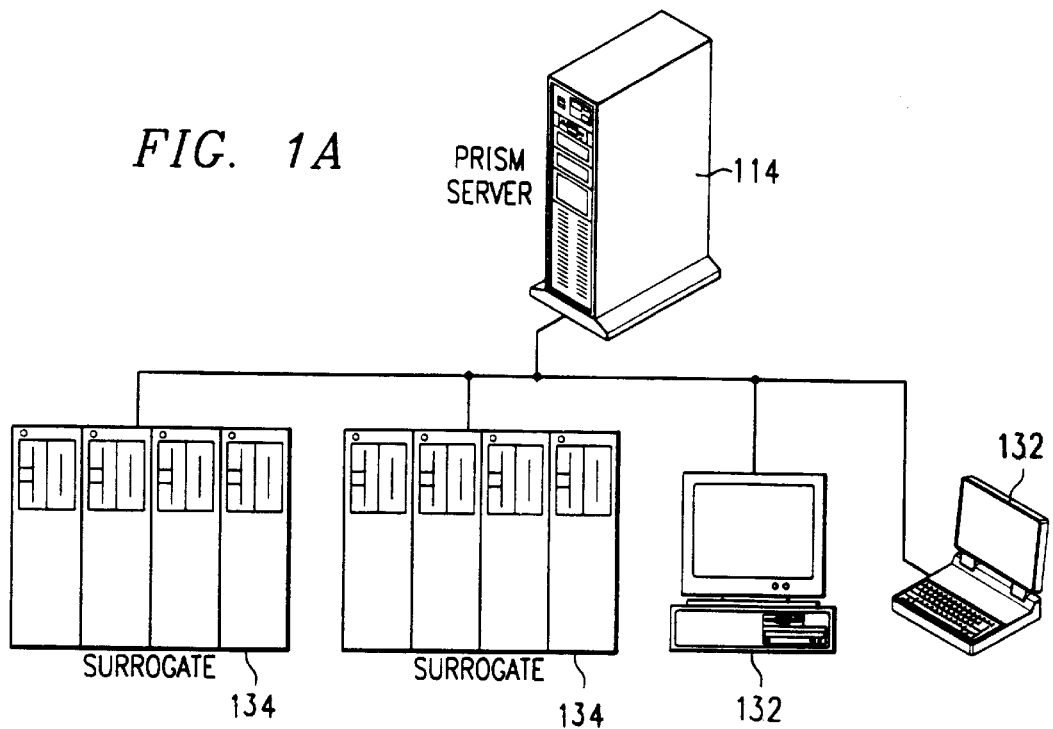
FIG. 1A schematically shows a network with combined direct and surrogate downloading.

FIG. 1A schematically shows a network with combined direct and surrogate downloading. A data server 114 (which is an SQL server in this example) provides data (disk images and/or files) to newly manufactured computers 132, as well as to surrogate loading stations 134, over a single network connection. This provides flexibility for efficient software loading as described below.

General Organization of Database Servers and Process Flow

The system of FIG. 1 is designed to provide efficient software distribution and installation which accommodates pre-installation of software on both raw hard drives and assembled PCs. This system is also designed to accommodate the distribution and pre-installation of software on an individual file basis or on an "as configured" basis (partitions, operating system, and selected software packages).

FIG. 1 shows an architectural overview in block diagram form of the hardware, interconnectivity, and data distribution flow preferably used to embody the novel computer manufacturing software installation system. This system is designed to provide efficient software distribution, configuration, installation, and tracking of software and hardware. The software distribution and installation system allows for release of software by one or more software engineering groups 102, each with its own development schedule, into a database network 104 which eliminates any duplicate files which may exist between groups and between versions of software released by the same group. The resulting database and software files are distributed to various master database servers 106 at remote manufacturing facilities. From these master databases, software is distributed to one or more local databases and their associated servers 108 for download onto personal computers in either a predetermined ("as configured"), build-to-order, or configure-to-order configuration. In parallel with the above described distribution of software files, rules for the configuration of the software are created and distributed, again by one or more software engineering groups 102, through the configuration and tracking system. The product configurations are released into a separate database network 110. The resulting information is distributed to various CCP servers residing at remote manufacturing facilities 112. Once both the software and configuration rules have been distributed to the manufacturing facility, software pre-installation can commence. The process communicates with the product configurations database 112. The product configurations database 112 holds information concerning configurations for particular assembled units and hard drives as well as the rules for configuring new units and hard drives. A process is run at the manufacturing facility on a client station 114 which accesses the product configuration database 112 and allows a hardware and software configuration list to be created or changed if it already exists. This process also references and enforces the rules of hardware and software configuration contained on the database 112. Once a configuration list has been created, the assembled unit (or raw hard drive in a surrogate machine) 116 is connected to the network. A separate process running on the assembled unit 116 accesses the product configuration database 112 and retrieves its configuration list. The process then accesses a local software database 108 and commences the actual download of information onto its hard drive. Once the software has been downloaded successfully, diagnostic checks are performed and software set-up routines are run on the assembled unit 116 and product configuration database 112 is updated to reflect that a software pre-installation has taken place for the particular machine 116. The configuration list for the particular machine can then be used as "as built" data. This data is transmitted back to a database network 118 at manufacturing headquarters. This "as built" information can then be distributed to customer service systems 120 including service centers 122 which can rebuild a customer's hard drive based on the "as built" information. The information can also be used by royalty tracking systems 124 to ensure appropriate payment to third-party software providers and configuration and failure analysis systems 126 to evaluate diagnostic, download completion, and other data related to software pre-installation.

Figure 5A:
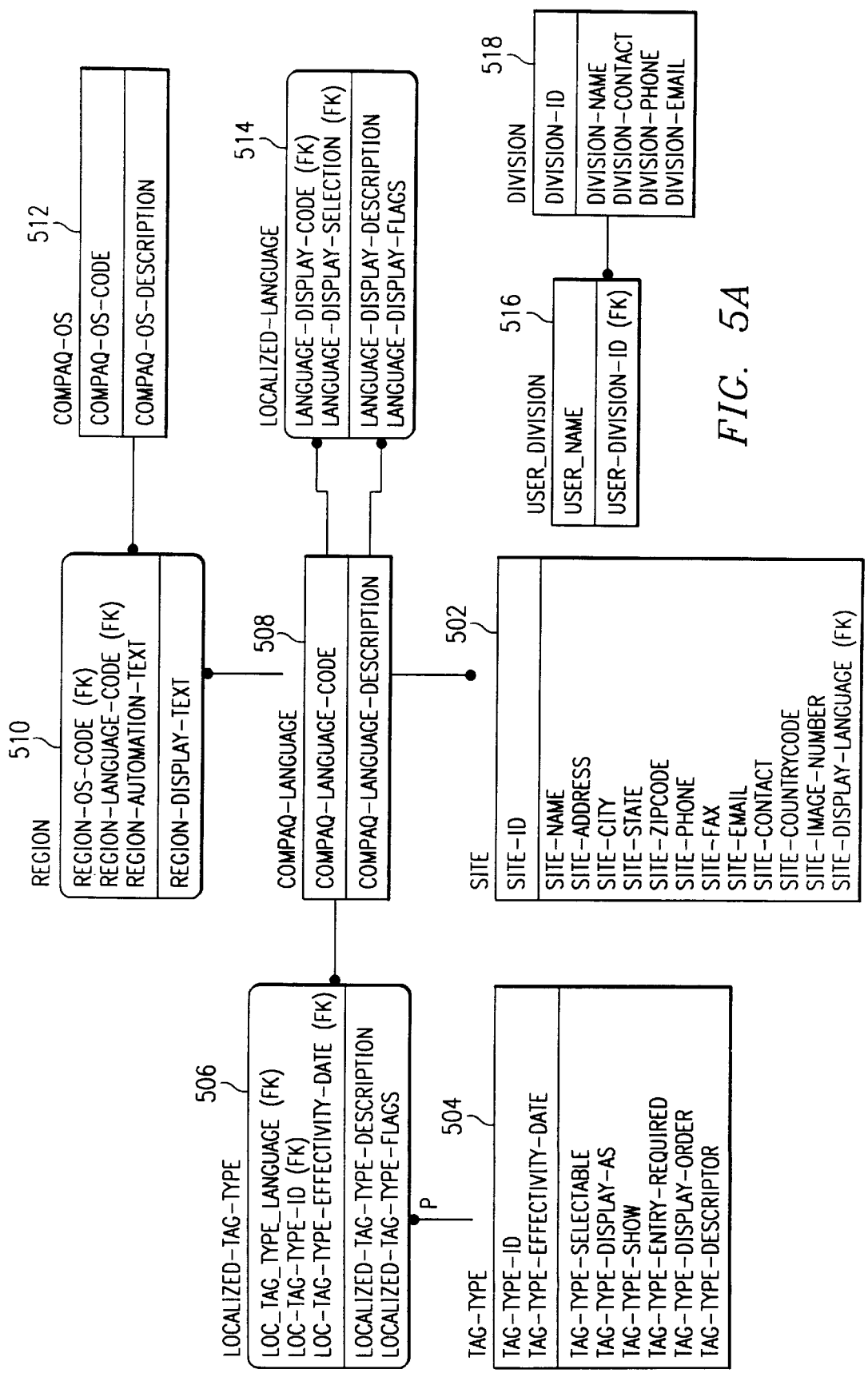
FIGS. 5A–C shows an Entity-Relationship Diagram which describes the relational database structure utilized in the rules based software configuration process.
Figure 5B:
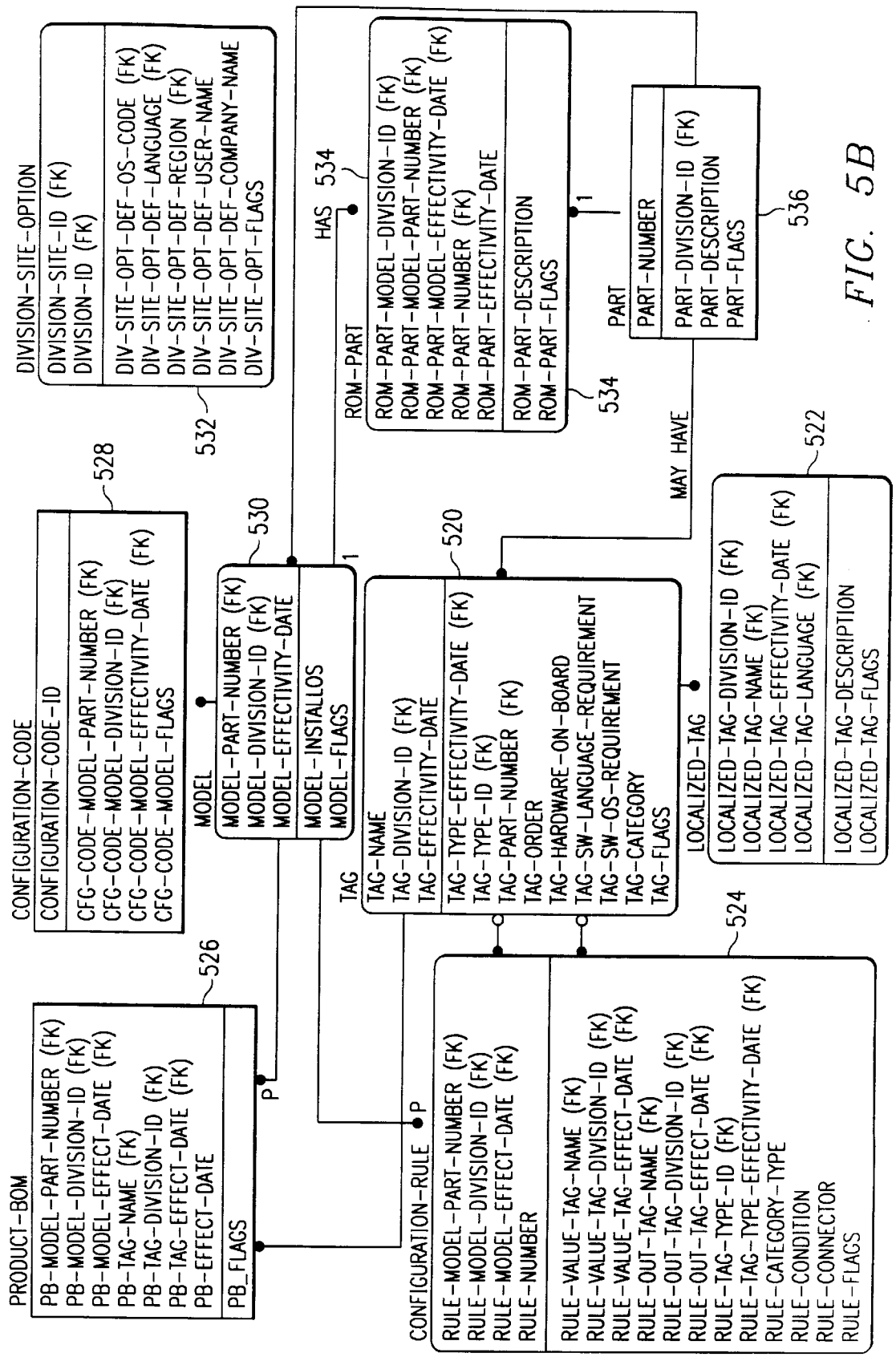
Figure 5C:
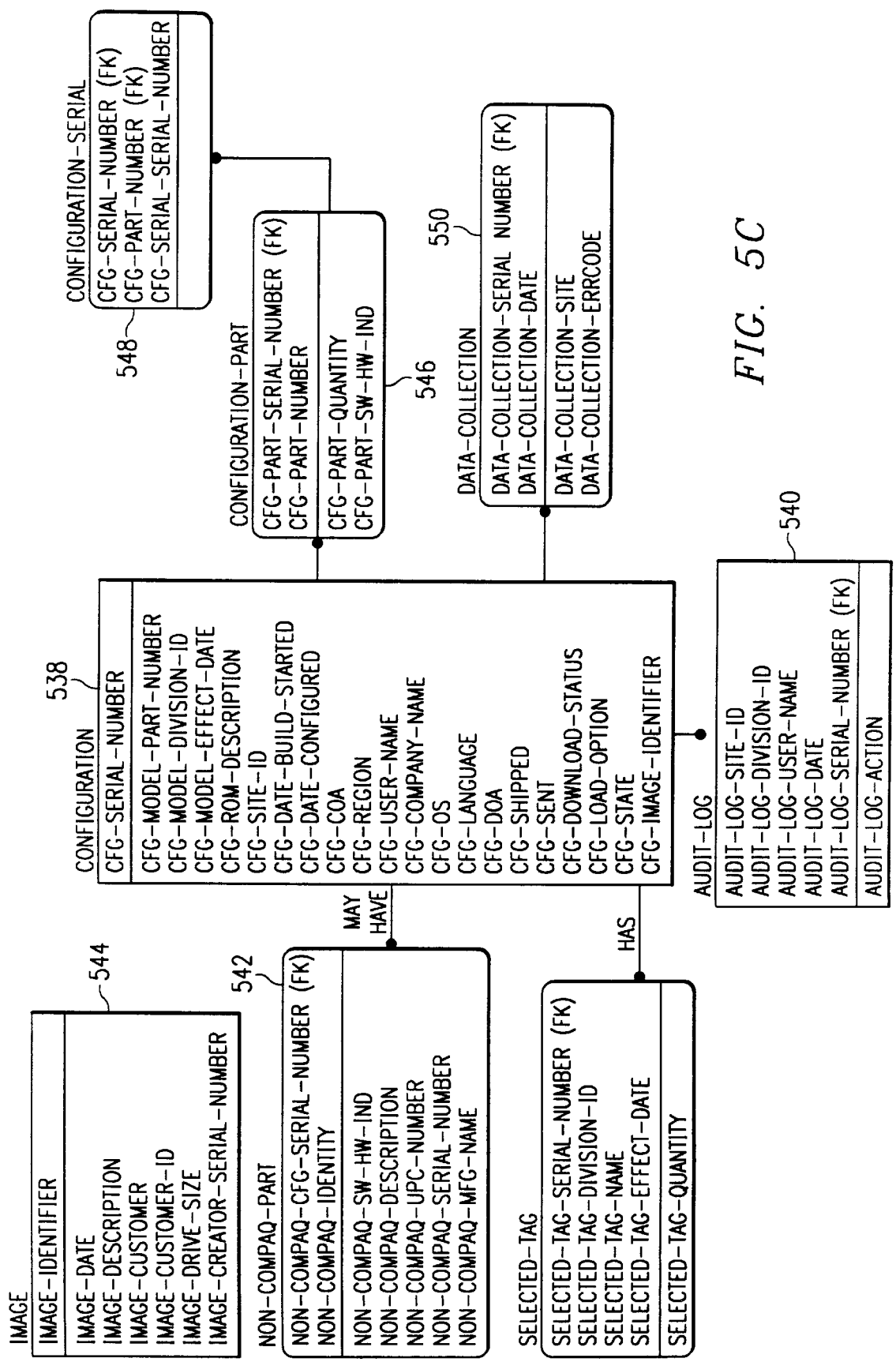
Figure 6:
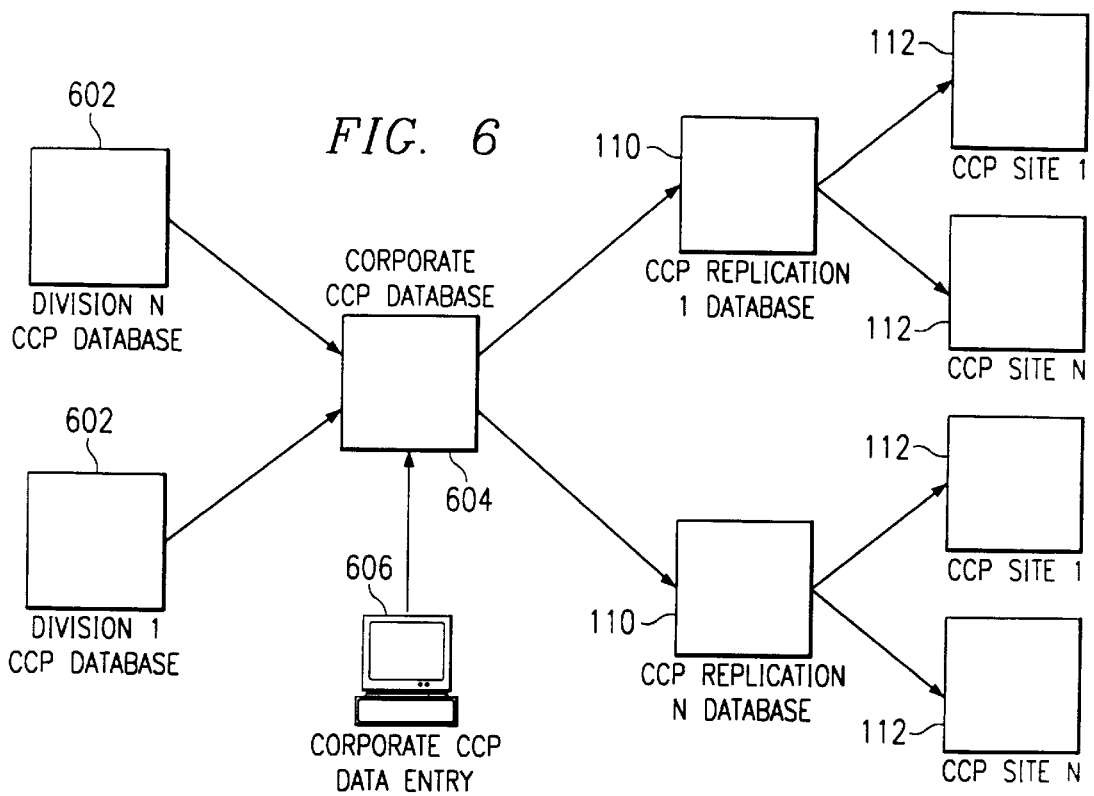
FIG. 6 shows a block diagram of the software configuration information data flow between manufacturing headquarters and a remote manufacturing facility.

FIGS. 5A–C show the ERD which describes the relational database structure utilized in the preferred embodiment. These figures are more fully described in Ser. No. 09/070, 431, filed Apr. 30, 1998. FIG. 6 illustrates the method by which the rules are released by various software engineering groups into the rules base network. This figure is more fully described in Ser. No. 09/070,431, filed Apr. 30, 1998.

Software Download Process

Figure 4:
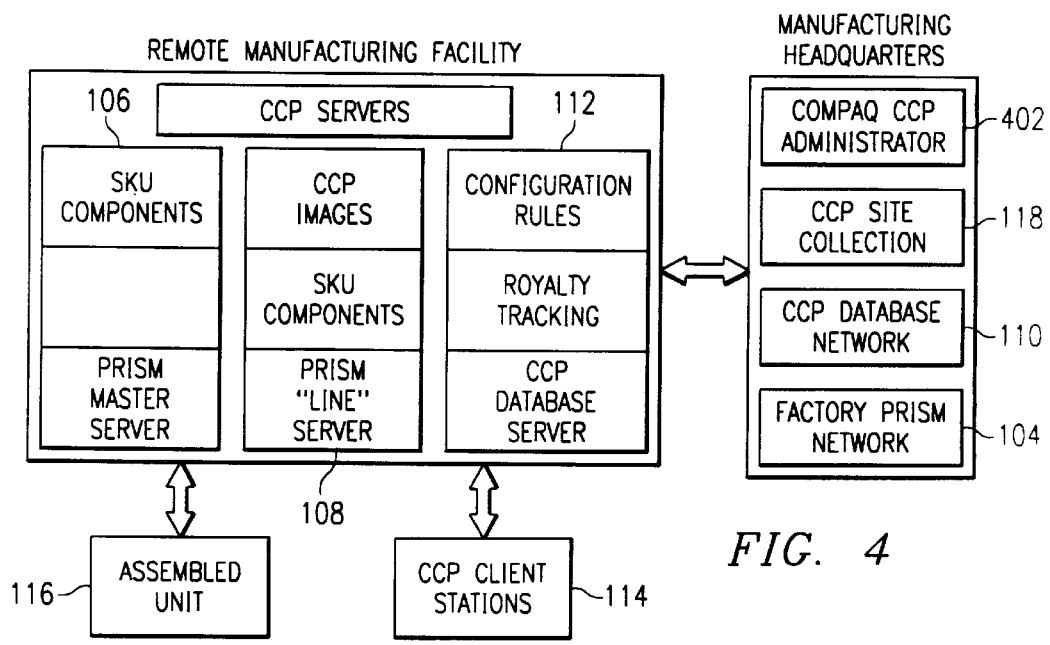
FIG. 4 shows a block diagram of the architecture supporting the software pre-installation system.

FIG. 4 depicts a block diagram which represents the connectivity between the CCP database, the PRISM database, the CCP Client Station, and the assembled unit. This figure is more fully described in Ser. No. 09/070,589, filed Apr. 30, 1998.

Figure 2:
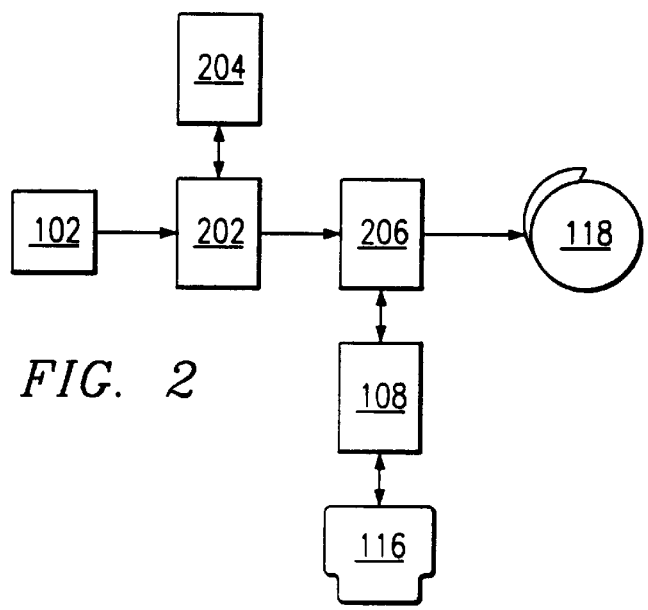
FIG. 2 depicts a block diagram of the data flow of the software downloading process.

FIG. 2 depicts a block diagram of the data flow of the software downloading process. In parallel with the above described distribution of software files, rules for hardware and software configurations according to machine model are created by one or more software engineering groups 102. These configurations are entered into the Variant Configurator™ 202, an off-the-shelf expert system.

Once the software has been distributed and the configuration rules have been entered, software pre-installation can commence. The Variant Configurator™ 202 is accessed by the manufacturer 204 to create a hardware and software configuration list for a particular computer or hard drive to be manufactured 116. This list is transmitted to the SFDM database 206. The SFDM database 206 holds information concerning configurations for particular assembled units and hard drives. Once a configuration list has been created, the assembled PC (or raw hard drive in a surrogate machine) 116 is connected to the network. The process then accesses a local software database 108 to commence the download. The local software database 108 retrieves the hardware and software configuration list from the SFDM database 206 and commences the actual download of information onto the hard drive. Once the software has been downloaded successfully, diagnostic checks are performed on the assembled PC 116 and the SFDM database 206 is updated to reflect that a software pre-installation has taken place for the particular machine 116. The configuration list for the particular machine can then be used as "as built" data. This data is transmitted back to a database network 118 at manufacturing headquarters.

The table structure or entity-relationship diagram (ERD), which constitutes the relational database used throughout the software distribution process is described in detail in Ser. No. 09/002,152, filed Dec. 31, 1997 (Atty's No. P-1721). First, the network architecture which accommodates both surrogate and direct pre-installation of software will be described. Next, the software installation process for both surrogate and assembled units which takes place via GEMINI will be described in detail.

Introduction of Software to the Distribution System

Figure 3:
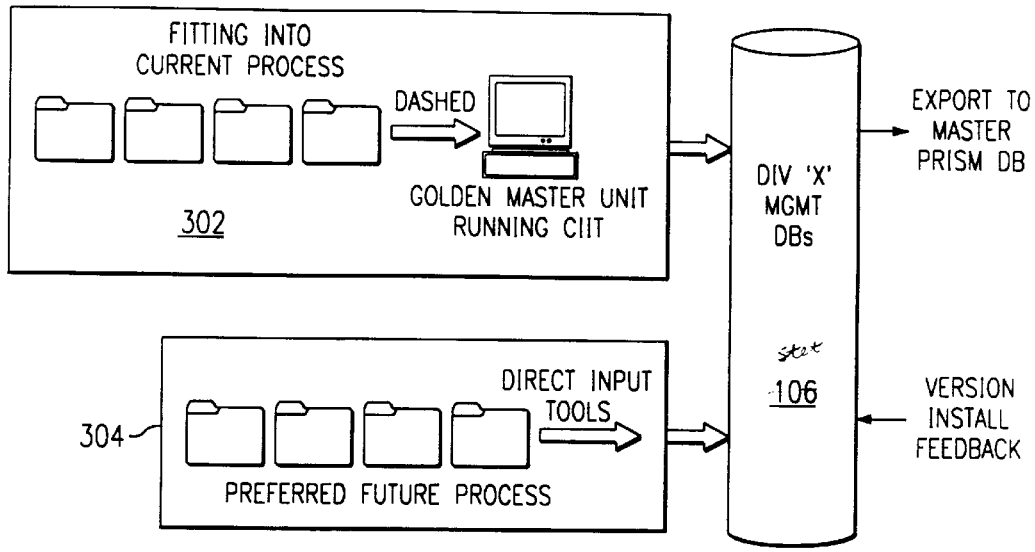
FIG. 3 shows a block diagram of the method by which software may be released into the novel computer manufacturing software download distribution system.

Data management structures used by a software engineering group do not need to conform to this ERD. However, once SKU numbers are assigned to images ready to be released, each must be unique. FIG. 3 illustrates, in block diagram form, two methods by which software may be released by software engineering groups into the software distribution system in a manner conforming to the ERDs described above.

CIIT

The first method 302 is via the Consolidated Image Importer Tool (CIIT), a utility that can be used by a software engineering group to "check" software into the group's database 106. CIIT is run on a machine known as a "golden master" which contains "installed" versions of the software to be released to the software distribution system by the software engineering group. CIIT will import every file from the "golden master", including the boot sector, partition, and all directory information, into the engineering entity's database. Any duplicate files are eliminated during the import process. To organize the production files for database entry, the software versions are grouped together as a Stock Keeping Unit (SKU)/Bill of Materials (BOM) combination. The SKU identifies the CPU, the primary hard disk, the country/keyboard, and whether software will be pre-installed in the factory during manufacture. A BOM is a list of the software files which will be copied to a computer during factory software pre-installation. A BOM is the identifier used to recall a specific disk image and is used by a software engineering group for tracking the image. The disk image referenced by the BOM represents what the engineering entity wants the customer to see when he or she boots their computer for the first time. Both the SKU and BOM are used by the software download database and the software download process (GEMINI) to ensure that all necessary software will be downloaded at the computer manufacturing facility's software pre-install.

CIIT is normally run automatically from a Windows 95 boot diskette which is booted on an example target 'golden master' machine containing software versions which should be grouped together logically as a Stock Keeping Unit (SKU) and Bill of Materials (BOM) combination. The 'booting from diskette' concept allows CIIT to run in a predictable and unrestrained environment, under DOS, regardless of what operating system, TSRs, drivers or applications which may be installed on the golden master. Thus, CIIT can completely scan the hard disk and log into a database its file system type, partition information, boot sector, directories and finally the actual files themselves. This storage scheme also lowers the amount of disk space needed as multiple BOMs can reference the same file, eliminating the need for duplication. The table structures that CIIT is designed to support completely normalize the data, eliminating any duplicates. If files are found on the example machine which already exist on the database, only the table entries necessary to catalog its necessity are made. Since the file data already exist, there is no necessity to duplicate it.

The second method 304 is meant to take advantage of CIIT's ability to break down disk images as components, however, it is designed to do so on a smaller scale. Instead of describing an entire disk image in terms of components, this method works on particular files or groups of files which must be installed together. These can include the operating system and its associated files, an application and its supporting utilities, or even a stand alone TSR.

The ERDs described above for the preferred embodiment are only one way of representing the data needed to distribute and install the software. Both the ERDs and CIIT can be altered according to the needs of the distribution system. CIIT is merely a vehicle for breaking the disk image of a hard drive down into its component parts. Once the component parts have been identified, information concerning them can be inserted into a software distribution database in many different forms.

As in the alternatives for ERDs, CIIT can also alternatively be configured to store entire disk images without a file by file break down. In a further alternative, CIIT can be configured to store each file on the golden master as a separate SKU which can be stored and downloaded on its own. Of course, any range of component break down between these two examples can also be achieved.

Alternatively, it is important to note that individual software files can be placed into the database tables without the aid of a software process. As long as a database model exists which allows identification of the components, the database can be populated with information concerning them by human entries via keyboard or other input devices.

Distribution of Software to Computer Manufacturing Facilities

Once the software releases and their associated database entries have been placed on the master PRISM database 110, a replication process becomes responsible for their transfer to the various computer manufacturing and test facilities and their associated local databases and servers. A separate distribution server 120 can be used to "publish" the released information to the manufacturing sites. Although most database schemes, particularly SQL, are equipped to replicate their contents between like structures, since the released files are not kept as BLOBs within the database, a separate process must be used to ensure the replication of the software releases themselves.

Once data is entered into the master PRISM server 110, the DBMS replication process takes over to distribute this data to the various computer manufacturing and test facilities and their associated local databases and servers. All tables defined in the software distribution system specification are replicated to these servers.

The basic replication scheme makes use of the existing replication capabilities provided by Microsoft SQL Server 6.0 to the extent possible. Transaction-based replication is configured on all of the database tables, so that any changes to these tables are replicated to other servers around the world. The master PRISM database server provides the beginning point of all replication using these mechanisms.

Figure 9:
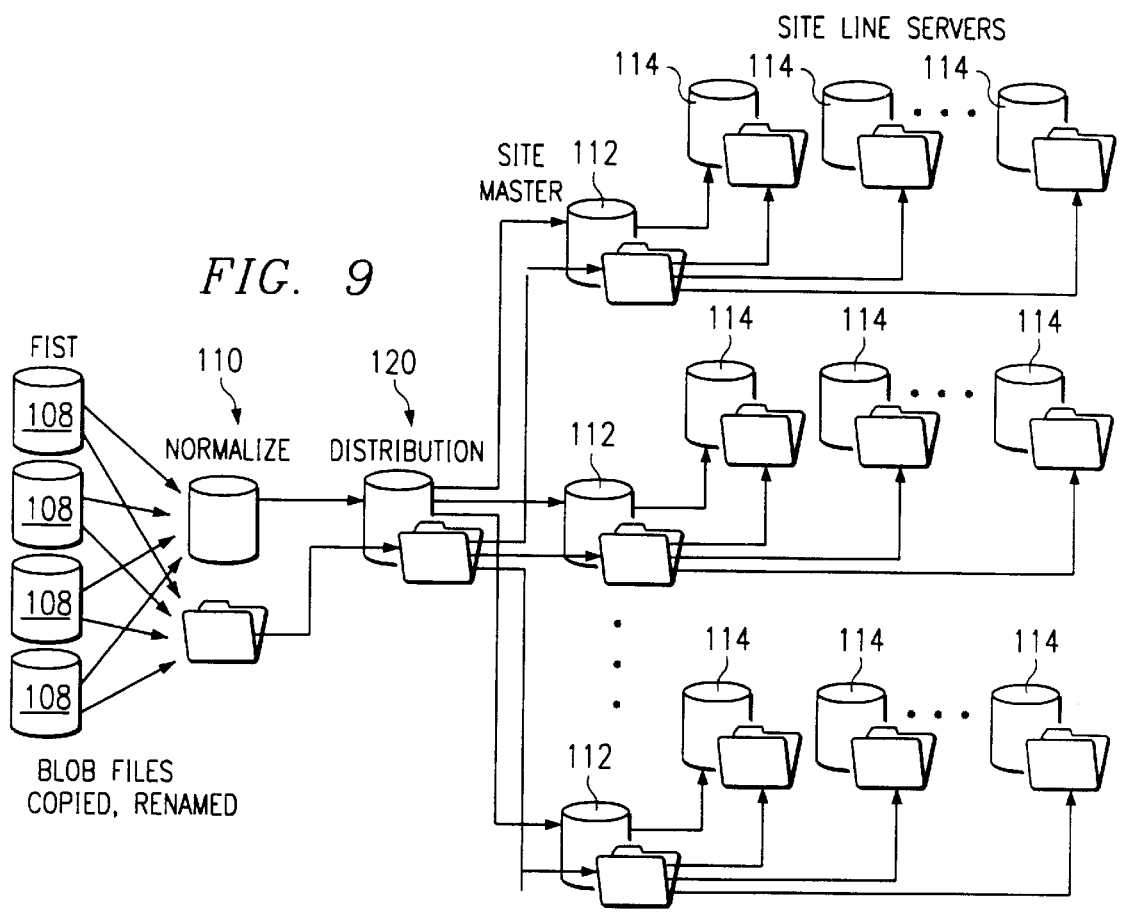
FIG. 9 shows a block diagram of the method by which data associated with released software in the master isolated database is replicated to remote manufacturing sites.

FIG. 9 illustrates the replication architecture with its associated dataflow. In FIG. 9, a machine 120 separate from the master site server is included in the replication set-up. This machine 120 is configured as an SQL Server "Distribution" server for the master PRISM server 110. This configuration allows most of the work of replication to be done by the Distribution server 120, rather than by the master PRISM server 110. Of course, replication to master site databases 112 can be accomplished without this intermediate "distribution" server 120.

Replication of most table data uses built-in transaction replication features of SQL Server. Replication is configured using a tree-like hierarchy. Transactions performed against the master PRISM server 110 are "published" (replicated) to the distribution server 120 (the subscriber to the publication, using SQL Server terminology). The distribution server 120 is configured as a "publisher" machine, and it replicates data to all the master site servers 112. These master site servers 112 are also configured as "publishers", and they replicate data to each of the local SQL servers 914 at their sites. These local SQL servers 914 are used directly by the computer manufacturing software installation process to build the target machines, completing the chain of replication.

Database transaction changes are straightforward to configure using built-in features of SQL Server 6.0. However, since SQL 6.0 does not replicate "image" data types (the actual BLOb files) on a transaction by transaction basis, an external mechanism is used to cause BLOBs to be distributed to all destination SQL Servers. Since SQL Server 6.0 replication depends on primary keys (and since documentation recommends this), all databases beyond the master PRISM database 110 and its associated distribution server 120 are configured with read-only (SELECT only) permissions for all tables. No INSERT, UPDATE, or DELETE operations are allowed to occur (except via Replication mechanisms) to any replicated table in the system beyond the master PRISM database 110.

SKU Component Rules
  SKUToBOM.Ordering Rules
  Within SKU Components the SKUToBOM.Ordering field takes precedence over the BOM.SWType field. The only valid ordering that may be specified for Components is from 0 to (n−1) where n is the number of BOMs comprising the component. If BOMs within the component contain the same files, the file within the higher ordered BOM takes precedence over the lower ordered BOM. BOMs not contained in the same SKU component are treated according to the BOM.SWType rules for CTO builds.

BOM.SWType Rules
  The BOM.SWType field is a bitmask. It is valid to combine masks within the field to better define a component. For BTF SKUs and SKU Components, the database verification routine, AUTOSKUV, will enforce the following rules:
    Exactly one Master SKU Component per drive is allowed.
    Zero or one Operating System may be specified per partition.
    The download tools must enforce these rules for CTO Builds composed of multiple SKU Components. In addition to the above rules, the download tools will use the SKUTo-BOM.Ordering rules within a component.

In addition, SKU Components may NOT contain BOMs with a BOM.SWType value of 0. SKUs that consist of multiple BOMs may not include BOMs with BOM.SWType=0. These rules are required so that AUTOSKUV can determine those SKUs that are components. AUTOSKUV will check non-component SKUs to ensure that only one partition per drive has Partition.SizeMB=0 (specifying the rest of the drive).

The ordering of components by the download tools will be described in more detail in an example on the next page.

Figure 14:
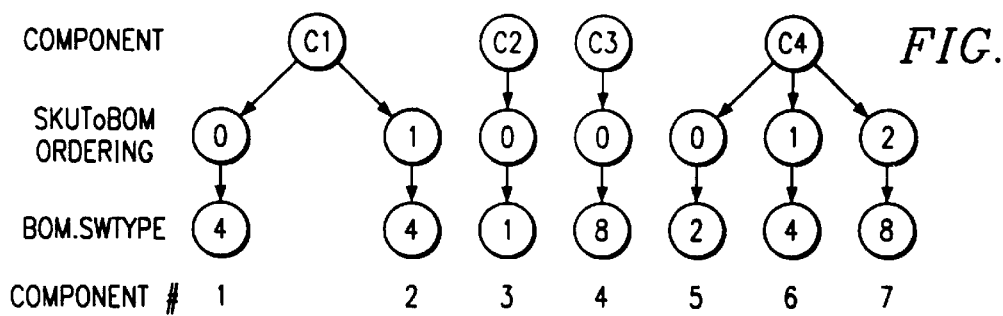
FIG. 14 shows a CTO build consisting of four SKU Components.

FIG. 14 shows a CTO build consisting of four SKU Components. In this example we have the following:

| Component # | Component | SW Type | Ordering |
|---|---|---|---|
| 1 | C1 | Device Driver (4) | 0 |
| 2 | C1 | Device Driver (4) | 1 |
| 3 | C2 | Master SKU Component (1) | 0 |
| 4 | C3 | Application (8) | 0 |
| 5 | C4 | Operating System (2) | 0 |
| 6 | C4 | Device Driver (4) | 1 |
| 7 | C4 | Application (8) | 2 |

The Component # field above does not exist in the database but was added for the purposes of this example.

With the above data, the components will be installed in the following order:

| Component # | Component | SW Type | Ordering |
|---|---|---|---|
| 3 | C2 | Master SKU Component (1) | 0 |
| 5 | C4 | Operating System (2) | 0 |
| 6 | C4 | Device Driver (4) | 1 |
| 7 | C4 | Application (8) | 2 |
| 1 | C1 | Device Driver (4) | 0 |
| 2 | C1 | Device Driver (4) | 1 |
| 4 | C3 | Application (8) | 0 |

Components C1 and C3 are installed in the order they are input into the download tools.

SKU Components
  SKU Components were originally defined for Configure to Order (CTO) software images. Build to Order (BTO) and Build to Forecast (BTF) images may consist of SKU Components, however. This definition was provided to assist the software engineering groups and the computer manufacturing facilities in defining all software images the same way.

For SKU Components the information in the tables must be interpreted somewhat differently than for SKU Images. SKU Components are entered into the tables as SKU entries. A SKU Component may consist of any combination of software. It may define a partitioning scheme, a software application, or a set of software applications. SKU Components are handled differently for Build to Forecast/Build to Order and for Configure to Order. SKU values in the SKU table are currently assumed to be standard 6-3 part numbers. It is recommended that BOM ID values for SKU Components be the same value as the SKU number for the SKU Component. This follows that revision numbers and effective dates should be in synch.

BTF/BTO SKU Components

Build to Forecast/Build To Order

Figure 15:
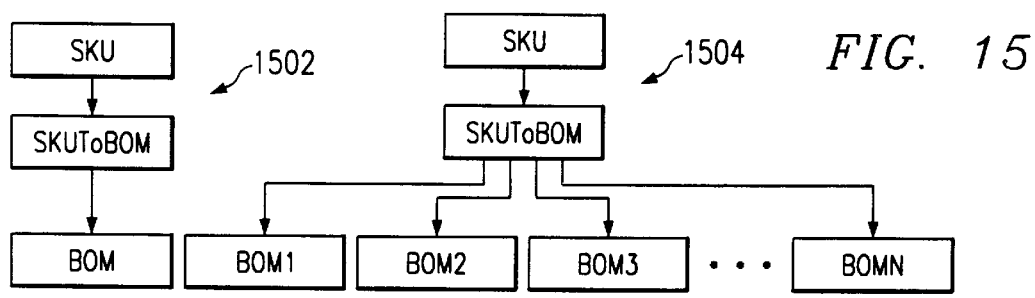
FIG. 15 illustrates standard BTF/BTO SKUs and BTF/BTO SKUs that consist of multiple SKU Components.

To allow Build to Forecast/Build to Order SKUs to consist of multiple SKU Components the SKUToBOM table points to multiple BOMs. FIG. 15 illustrates standard BTF/BTO SKUs 1502 and BTF/BTO SKUs 1504 that consist of multiple SKU Components:

Component Sequencing

Many times it is necessary to assure that components are applied to the hard drive in a specific sequence. To assure this occurs correctly, the SkuToBom tables Ordering field specifies the sequence components should be applied. This is used primarily for BTF/BTO SKU Images.

SKU Components, when entered into FIST on their own, should have a component ordering value of 0. Component ordering only has a meaning when multiple BOMs comprise a SKU Image.

Partitioning

Since SKU Components consist of multiple Partition tables, partitioning must be interpreted differently than for standard SKU Images. Partition information is submitted as the first deliverable for a SKU Image. This deliverable is referred to as the Master SKU Component and consists of the following information:

Drive partitioning scheme

Boot Sector for each partition

File system to be set up for the partition (FAT 12, FAT 16, FAT 32)

The Ordering in the SkuToBom table will always be zero for the Master SKU Component. If no partitioning information is provided, a Master SKU Component must be part of the SKU Image to build and must consist of all of the above listed information. If the partitioning scheme and file system specification are user defined, the Master SKU Component will only be interpreted to provide the boot sector for the file system. This requires that a user defined file system be mapped to the correct SKU Component containing the correct Boot Sector. The Master SKU Component must contain at least one file in the primary partition so the BOMSIZE and BOMMD5 fields are valid. Any files in the Master SKU Component are ignored, however, unless the Master SKU Component is combined with an OS/Application/Device Driver component.

The only partition information used for SKU Components defining deliverables are the Drive, Slot, and PhysicalOrder values. These indicate the drive and partition in which the deliverable is to reside.

Additional Table Data

For SKU Components the following table values are ignored, though they must contain valid keys for database integrity:

MBRDataKey in the BOM Table

DataKey in the Partition table (except SKU Component 0, the Master SKU Component)

CTO SKU Components

The CTO process is used in the building of machines to the specifications of individual customers. During the ordering process, a list of the SKU components necessary to build the customer's requested configuration is created. This list is stored in the software flow data management (or "SFDM") database. SFDM provides these stored lists to the PRISM database.

CTO builds consist solely of individual SKU Components. To handle this each SKU Component is queried individually and the download tools will build each Component individually. For Configure to Order, SKU Component sequencing is a more difficult problem to solve. Many times installation sequences depend on what other components are included in the build. FIST takes no responsibility for defining SKU Component sequencing in this case. The only information that FIST comprehends for component sequencing is the SW Type field in the BOM to determine if the component is a Master SKU Component, which defines drive partitioning, or if the component is the operating system. The Master SKU Component must be installed first and the operating system must be installed second. After that the other components may be installed in the sequence in which they are entered.

Partitioning

Partition information for CTO builds are provided through a Master SKU Component, the same as it is for BTO/BTF builds.

Figure 12:
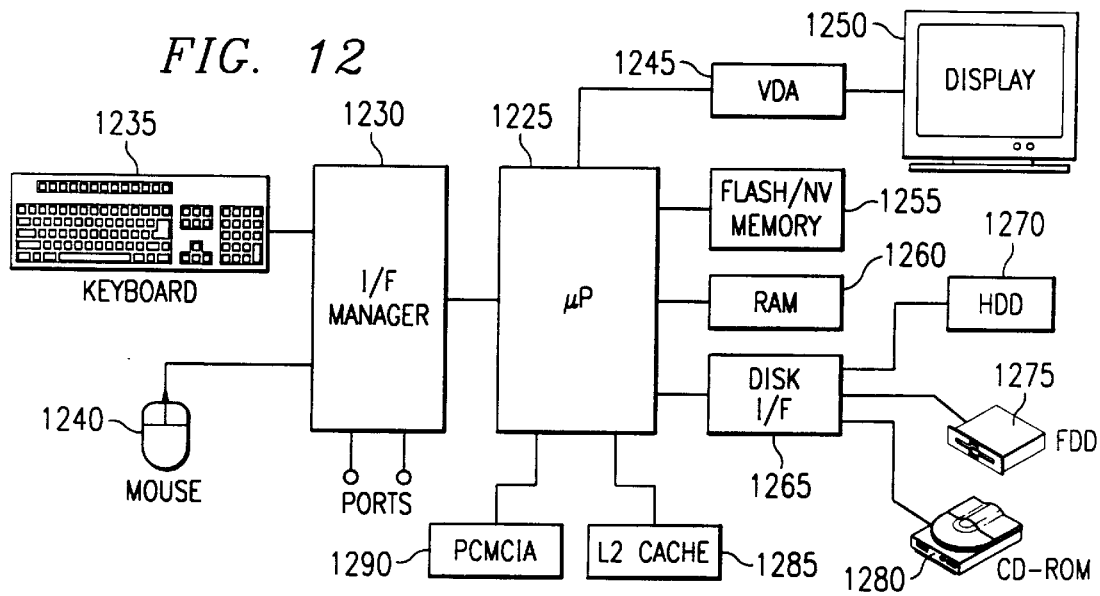
FIG. 12 shows a block diagram of a personal computer which can use the innovations described in this application.

FIG. 12 shows a personal computer which can use the innovative software distribution system. The complete personal computer system, includes in this example:

user input devices (e.g. keyboard 1235 and mouse 1240);

at least one microprocessor 1225 which is operatively connected to receive inputs from said input device, through an interface manager chip 1230 (which also provides an interface to the various ports);

a memory (e.g. flash or non-volatile memory 1255 and RAM 1260), which is accessible by the microprocessor;

a data output device (e.g. display 1250 and video display adapter card 1245) which is connected to output data generated by the microprocessor 1225; and a magnetic disk drive 1270 which is read-write accessible, through an interface unit 1265, by the microprocessor 1225;

Optionally, of course, many other components can be included, and this configuration is not definitive by any means. For example, the personal computer may also include a CD-ROM drive 1280 and floppy disk drive ("FDD") 1275 which may interface to the disk interface controller 1265. Additionally, L2 cache 1285 may be added to speed data access from the disk drives to the microprocessor, and a PCMCIA 1290 slot accommodates peripheral enhancements.

Download Process

Figure 7A:
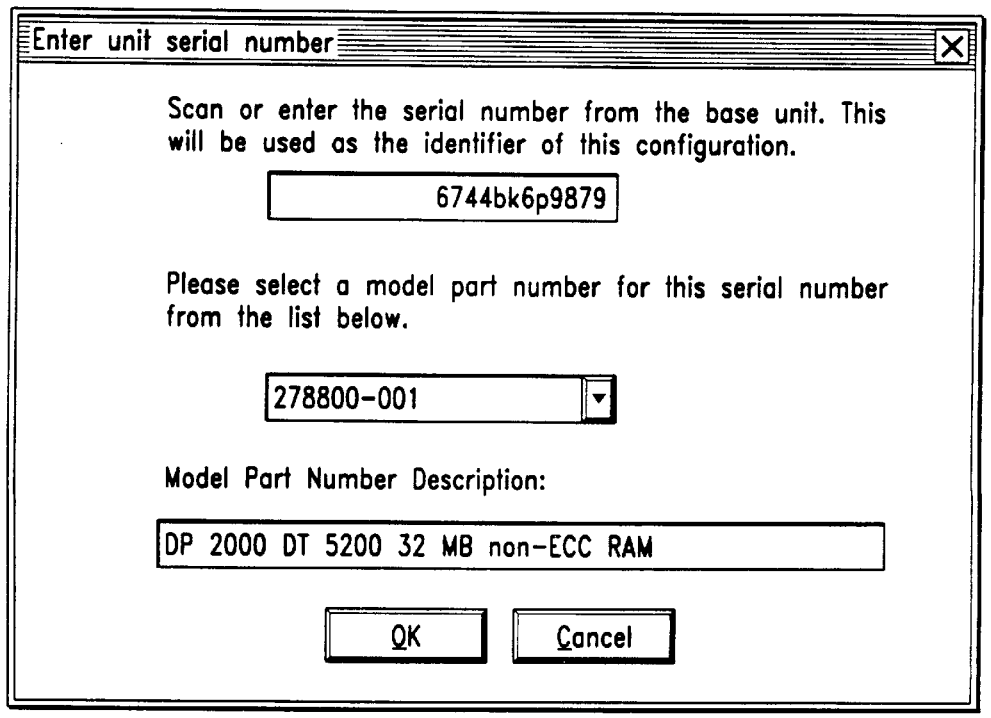
Figure 8A:
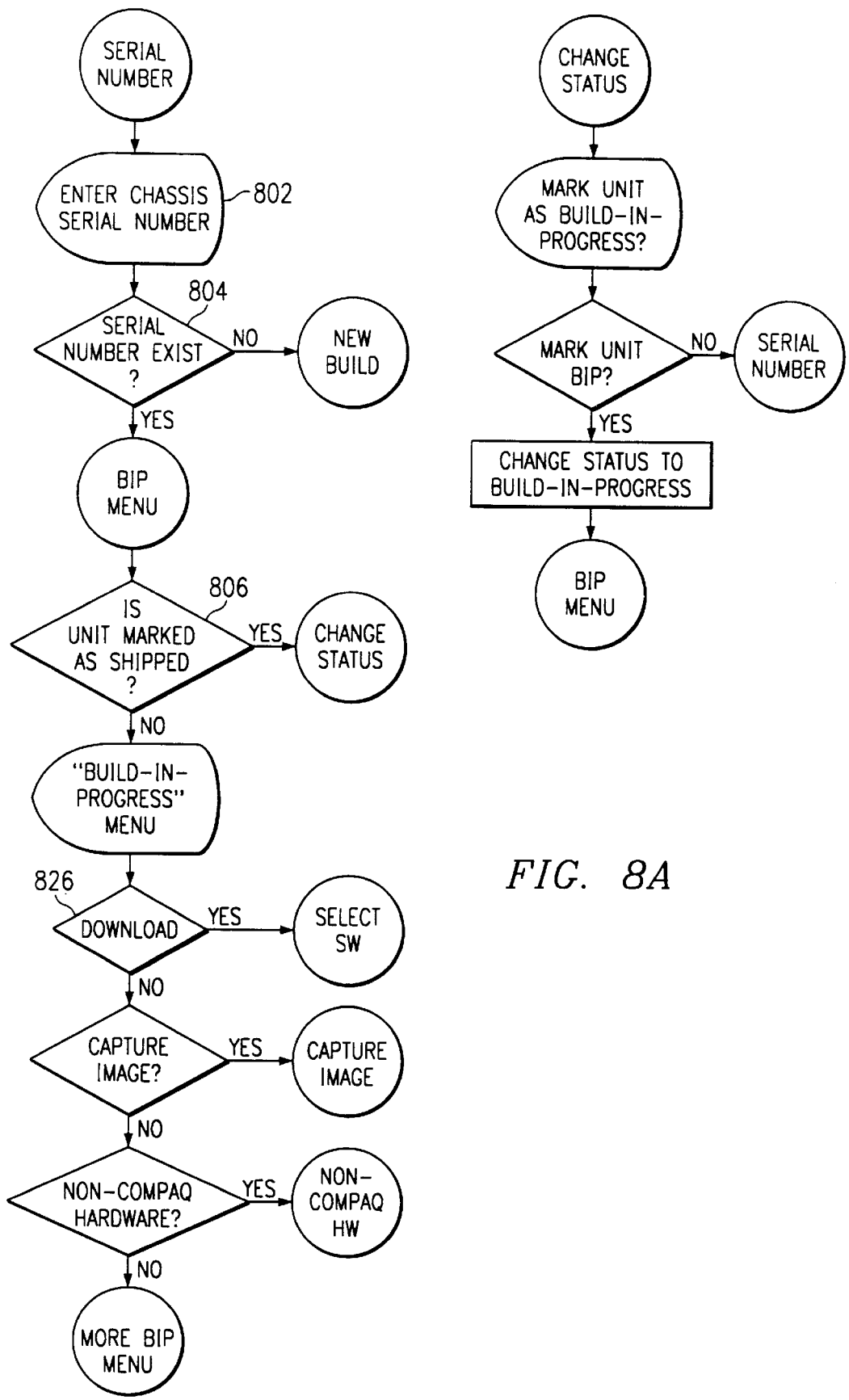
FIGS. 8A–F shows a flow chart of the hardware assembly, software selection and installation process.
Figure 8B:
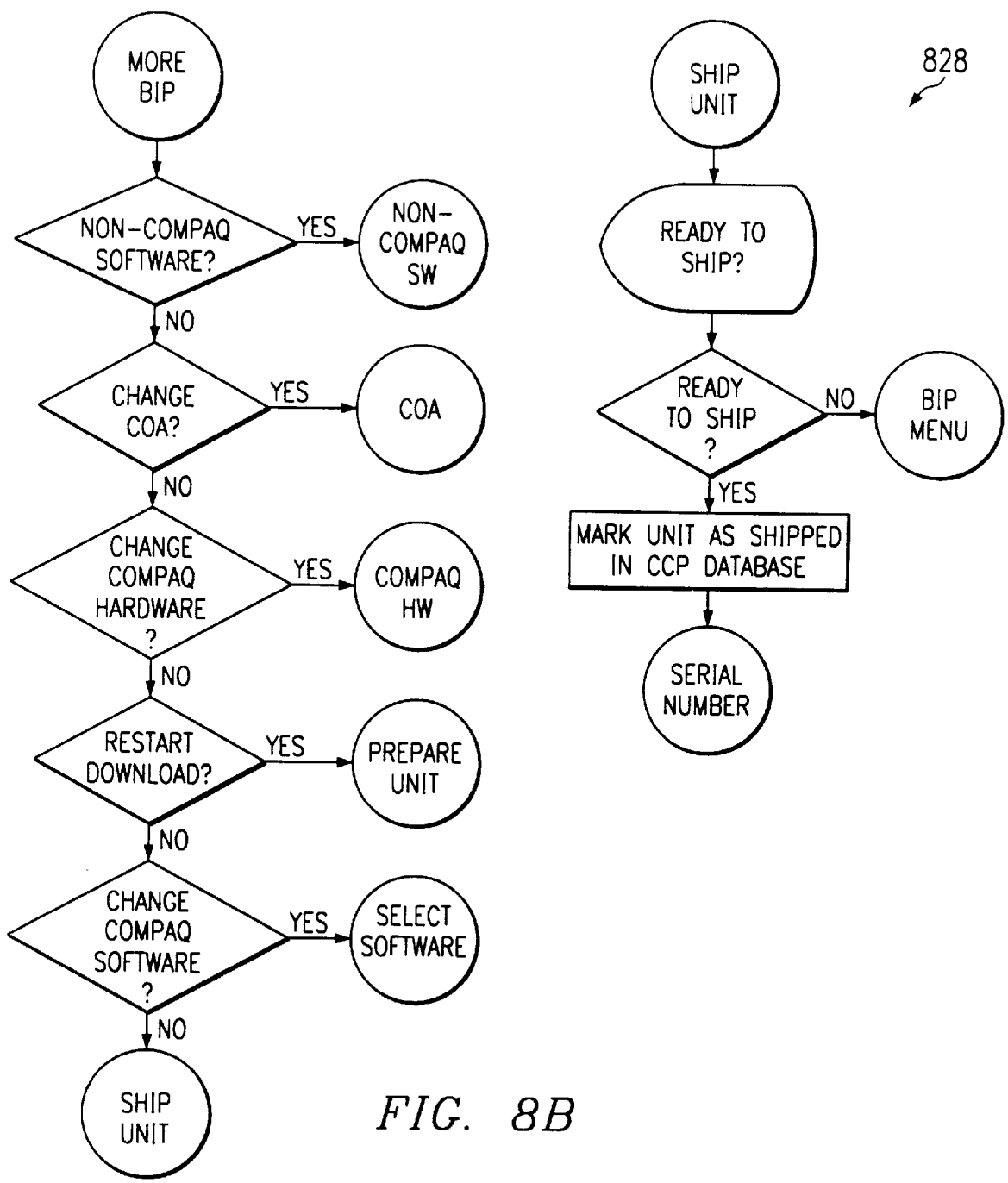
Figure 8C:
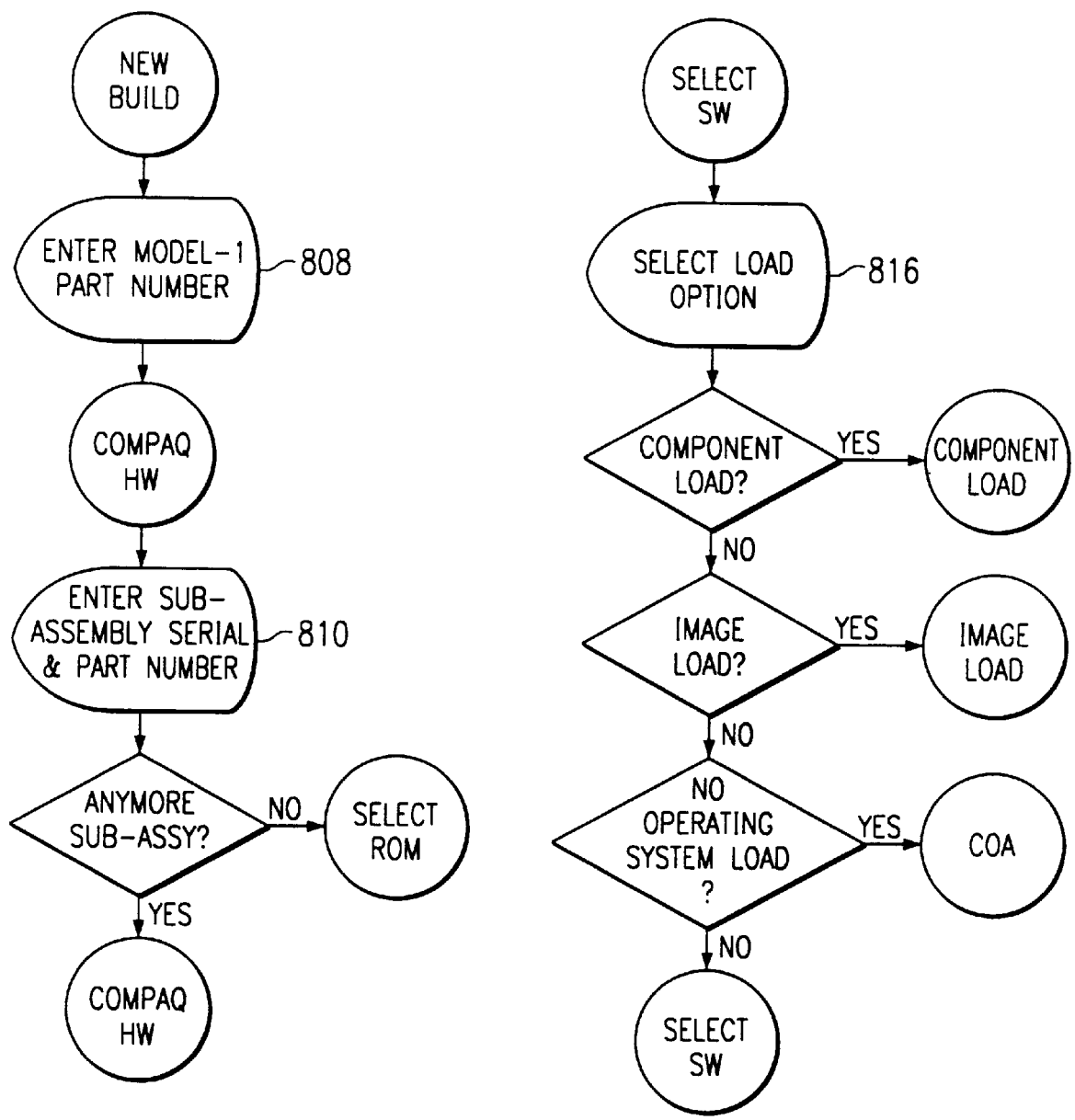
Figures 8D, 8E:
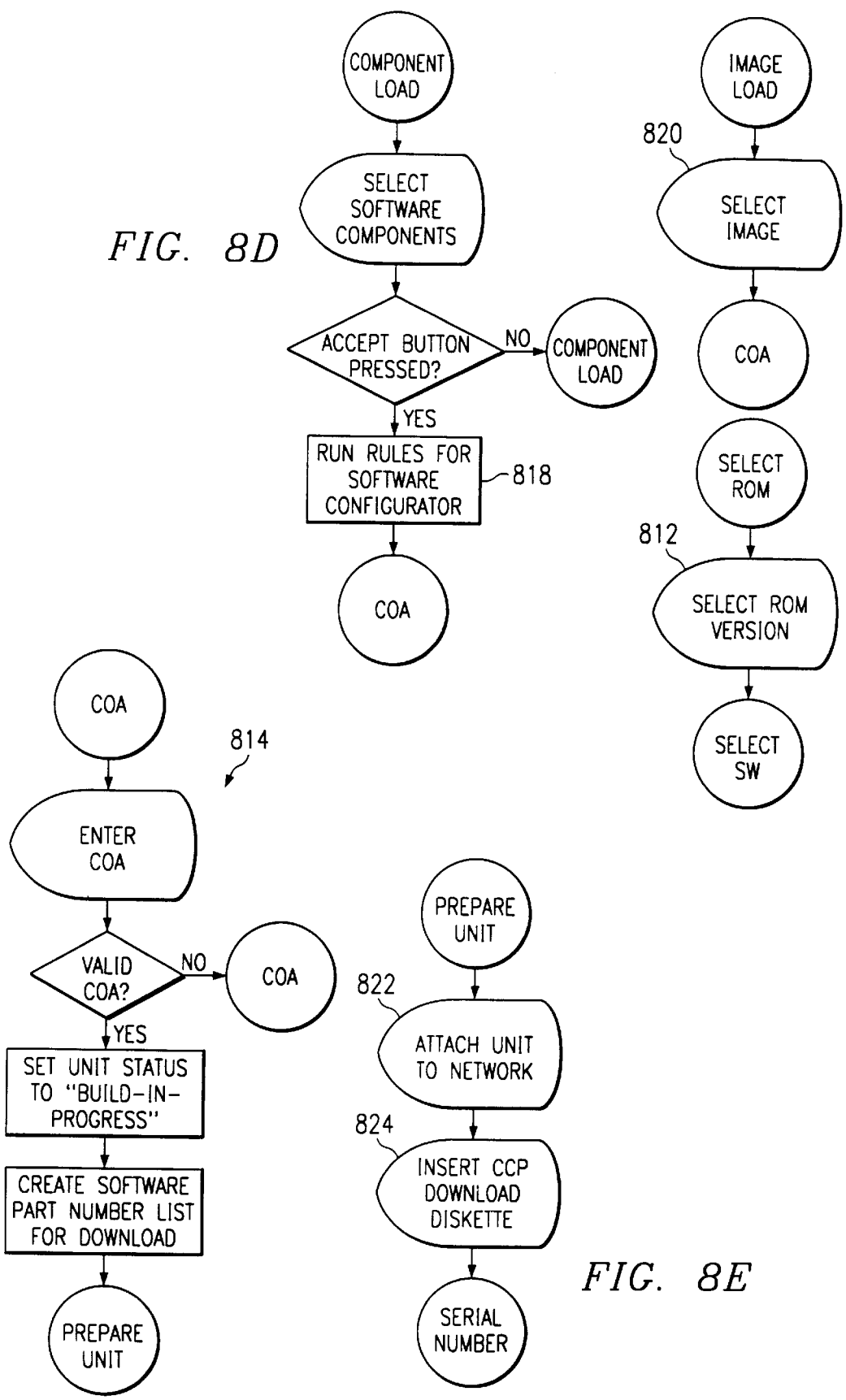
Figure 8F:
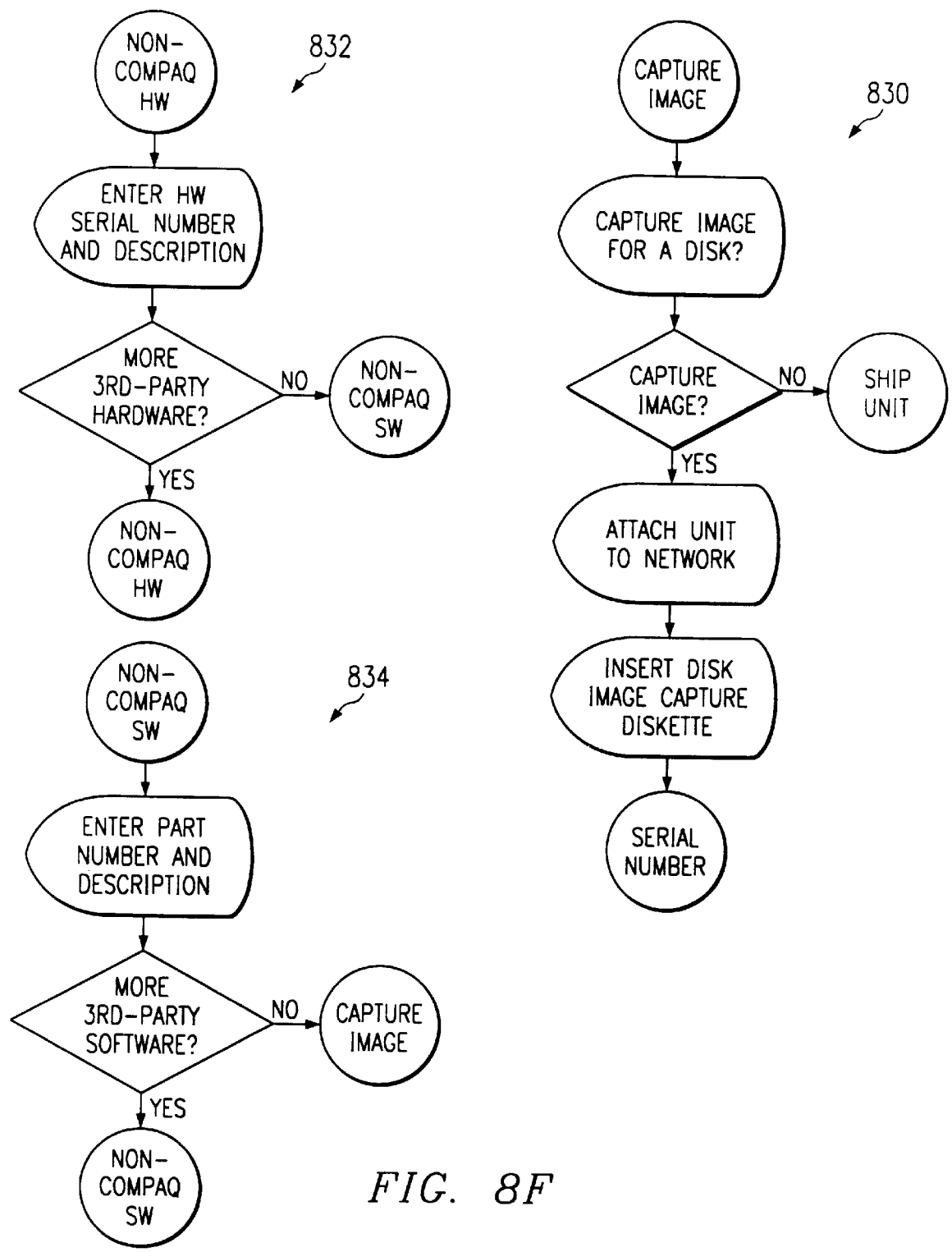
Figure 10:
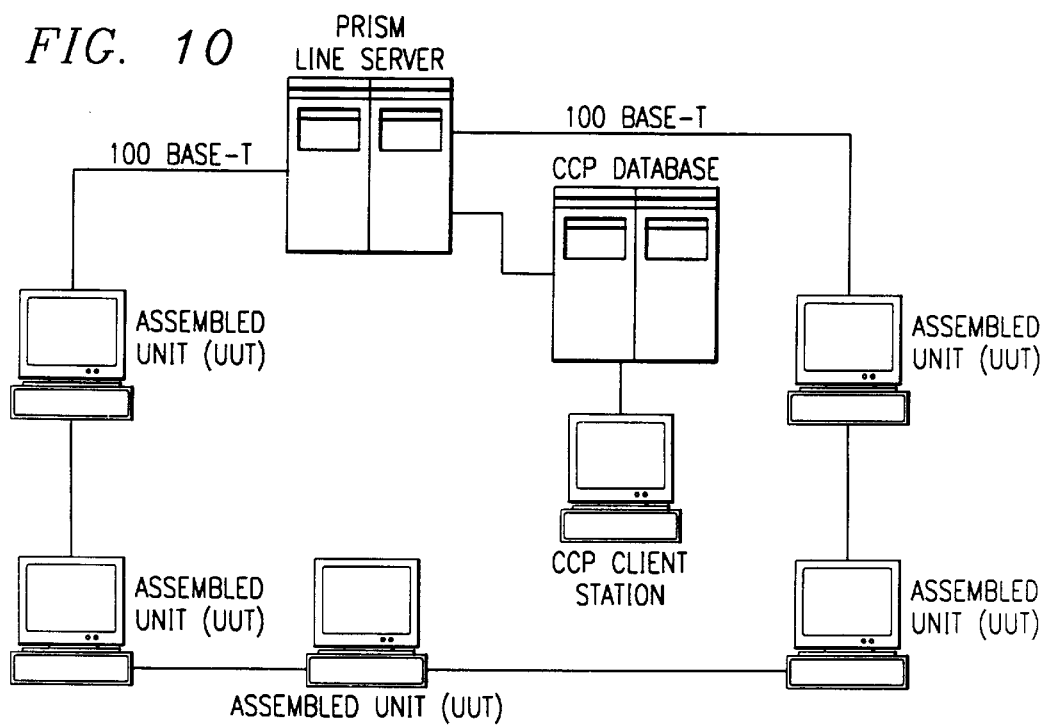
FIG. 10 shows a block diagram of the system architecture of a two-stage build installation process.
Figure 11:
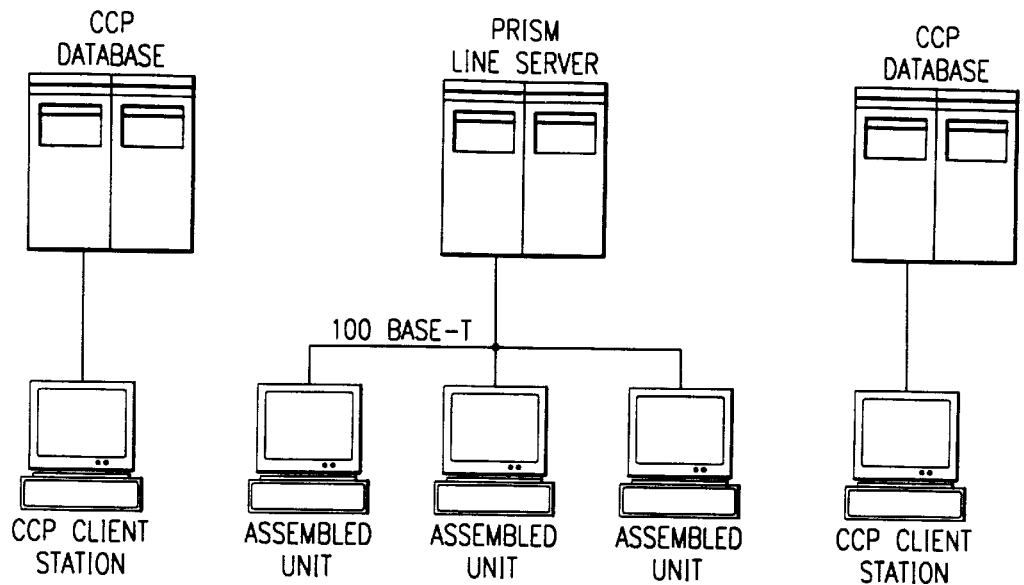
FIG. 11 shows a block diagram of the system architecture of a cell build installation process.
Figure 13:
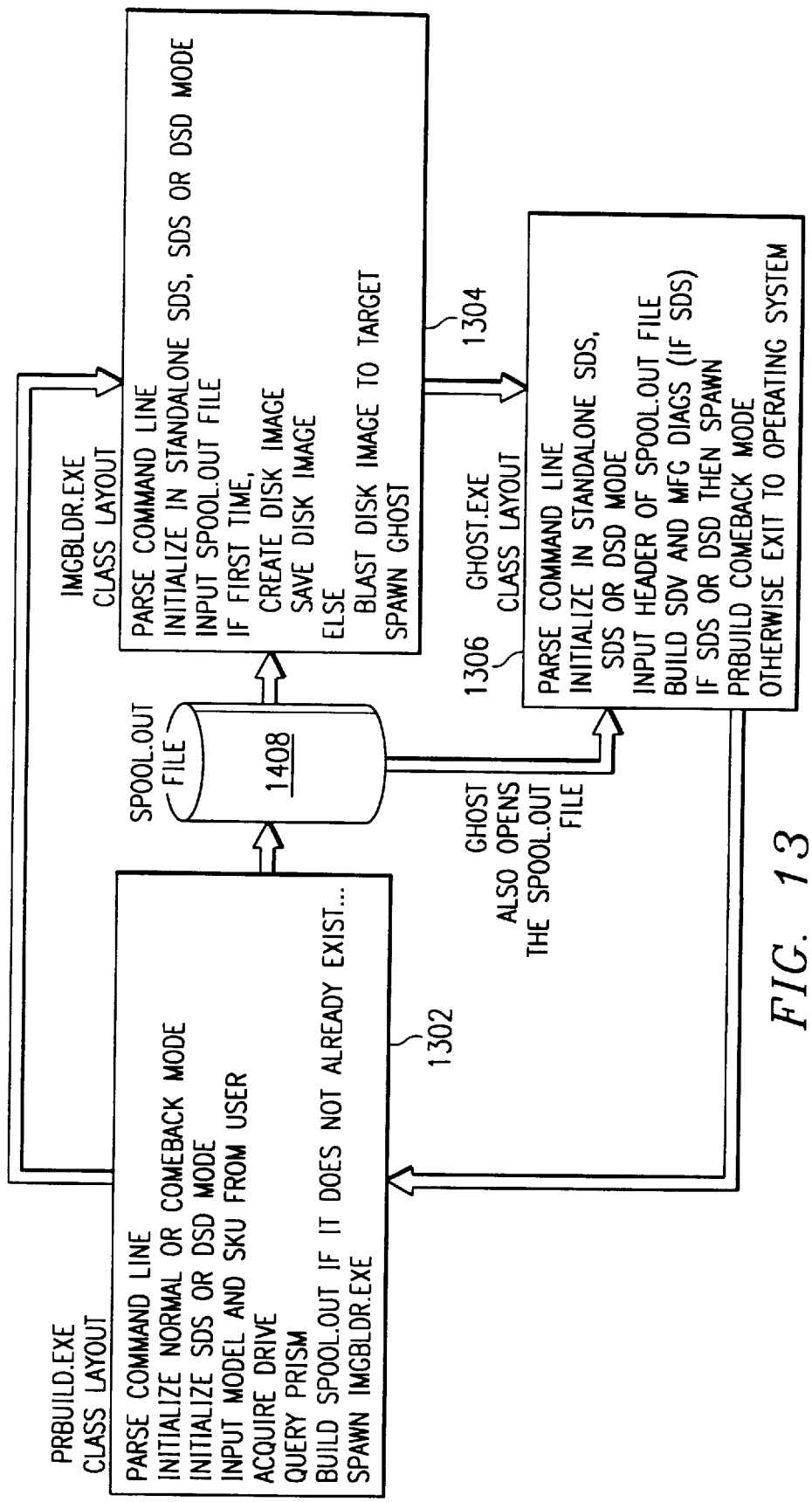
FIG. 13 shows a flow chart of the software download process.
Figure 16A:
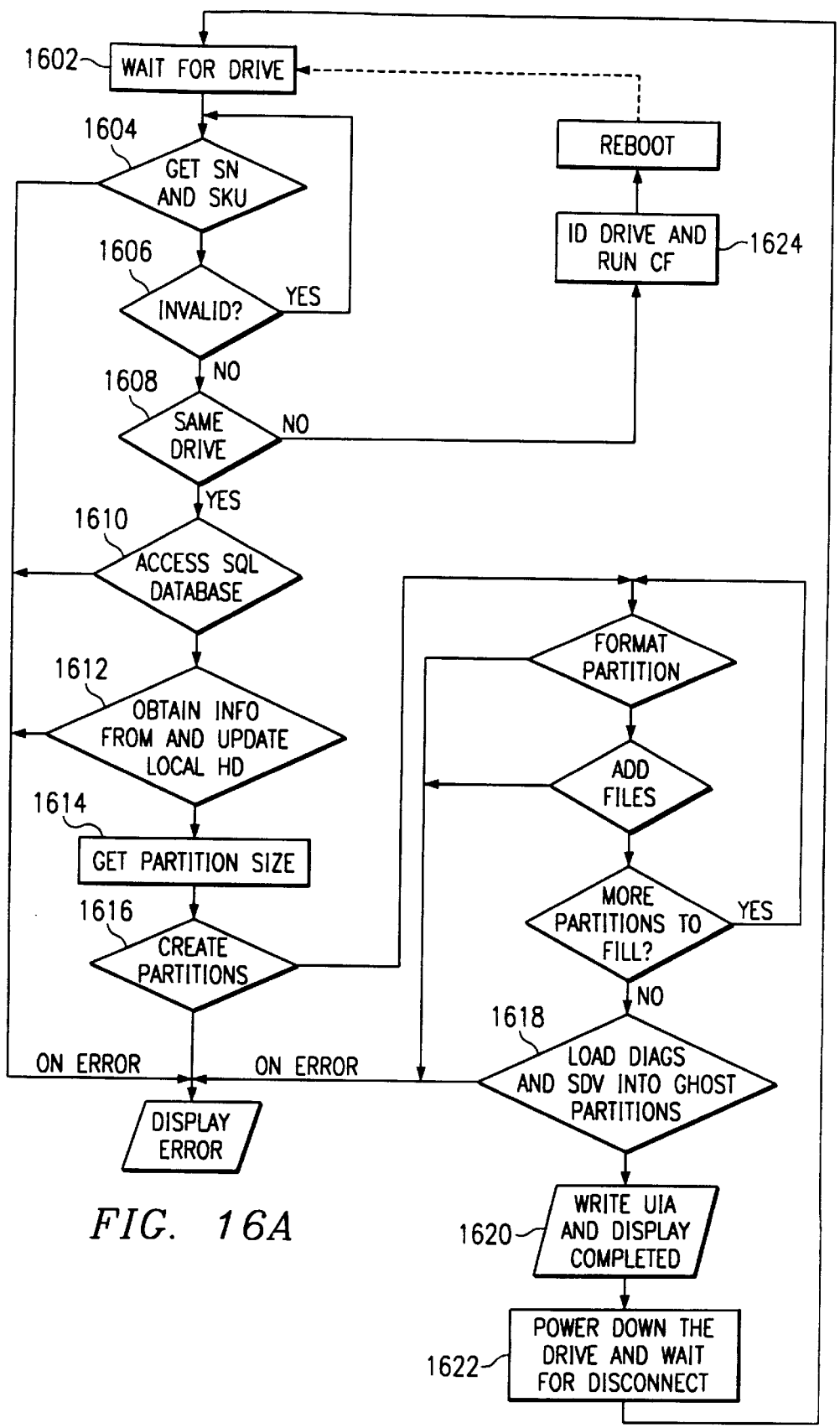
FIGS. 16A–B illustrate in flowchart form the software download process for direct and surrogate downloads respectively.
Figure 16B:
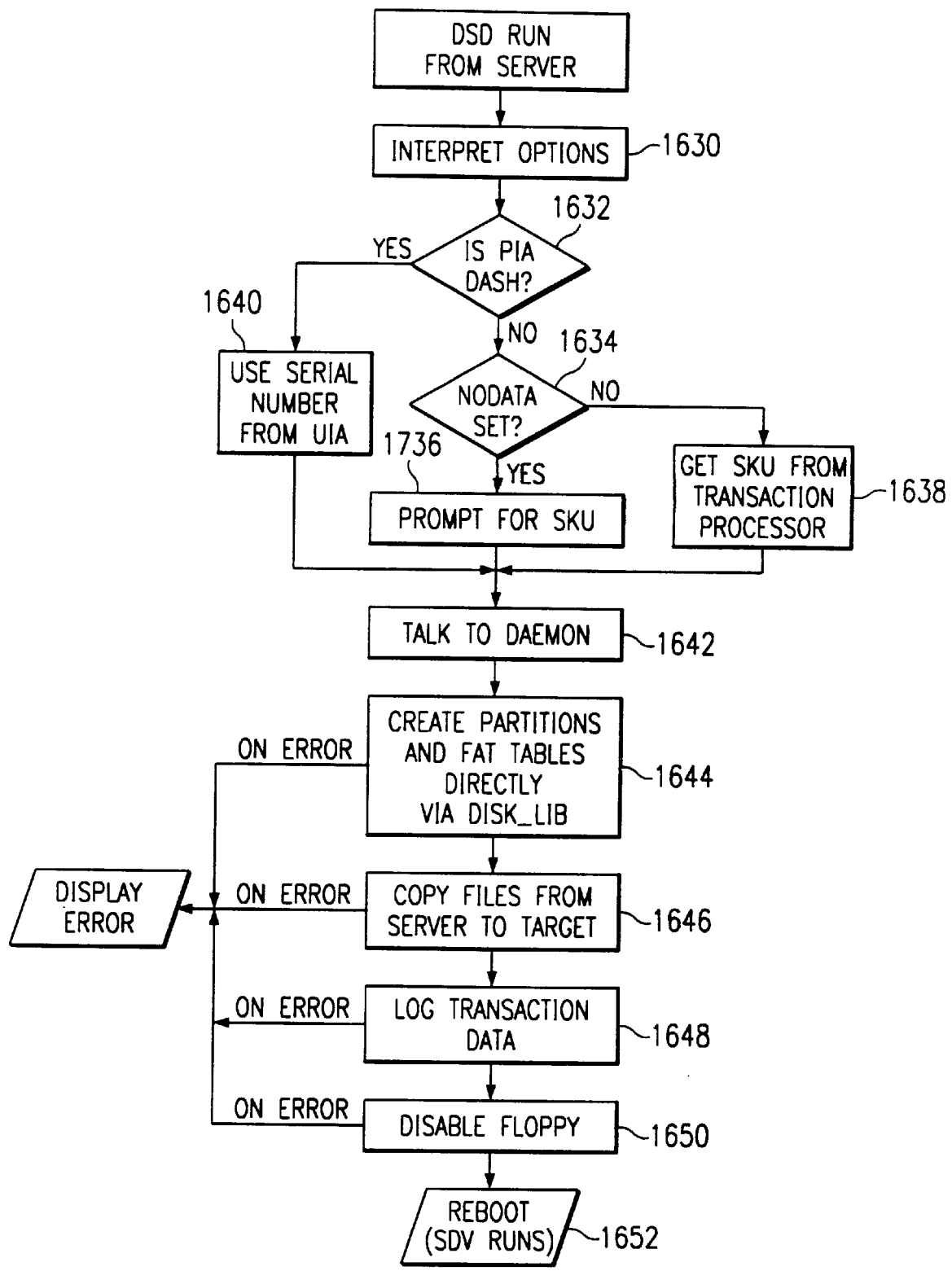

Prior to software installation, hardware for a particular unit must be assembled and the software to be installed on the assembled unit must be chosen. FIGS. 8A–F shows a flow chart of the hardware assembly, software selection and installation process. This figure is more fully described in Ser. No. 09/070,589, filed Apr. 30, 1998. FIGS. 7A–C depict input windows for hardware and software component selection. These figures are more fully described in Ser. No. 09/070,431, filed Apr. 30, 1998. FIG. 10 shows a block diagram of the system architecture of a two-stage build installation process. FIG. 11 shows a block diagram of the system architecture of a cell build installation process. These figures are more fully described in Ser. No. 09/070,589, filed Apr. 30, 1998. The download process for an assembled unit built as a cell build or two-stage build is the same. The download process is initiated by the machine on which software will be installed. The download tool utilized in the preferred embodiment is referred to as GEMINI. FIG. 13 illustrates in block diagram form the three independent processes which comprise the GEMINI software download process.

GEMINI allows both the surrogate and direct download processes to be executed from a boot diskette inserted into either the surrogate machine or an assembled computer. The boot diskette contains the information necessary for the machine, as operated in the factory, to locate the server and establish a connection with a unique ID, identify the drive to be loaded, determine which files to download, determine which diagnostics need to be run upon download completion, verify part serial numbers, and update itself from the server in the event of a new floppy disk boot version.

The GEMINI system splits the download process into three separate functions: 1) obtain a SKU and create a BOM list; 2) Build a drive w/the proper components and partitions based on the BOM list; and 3) Build ghost partitions in which software download verification and manufacturing diagnostic processes can be run. The programs were broken apart to increase available memory.

PRBUILD 1302: this process makes a 'packing' list of what files are needed for the given SKU as well as other global information about the drive such as file system type, boot file specs, etc. Once this list is made, PRBUILD 1302 spawns the next module: IMGBLDR 1304.

IMGBLDR 1304: this process takes as its input the packing list that was the output of PRBUILD 1302 and builds a drive with any combination of FAT16/FAT32 partitions. Once the drive is built, IMGBLDR 1304 spawns the next module: GHOST 1306.

GHOST 1306: this process takes as its input the packing list that was the output of PRBUILD 1302 as well as information about the end of data on the drive provided by IMGBLDR 1304 and builds ghost partitions on the drive.

GEMINI Module Communication

Currently, three methods exist for PRBUILD 1302, IMGBLDR 1304, and GHOST 1306 to communicate as they invoke each other: command line parameters, the World object and the SPOOL.OUT file 1308.

The command line parameters provide a simple way to communicate global states that are normally non-changing. A good example are the command line switches which allow PRBUILD 1302 to call IMGBLDR 1304 in a certain mode which will make their operation appear as one module to the user. The SPOOL.OUT 1308 file allows for much more specific and detailed instructions to be communicated between the three modules as well as being a convenient place to store certain persistent data such as the log structure. The World object is a persistent object that uses XMS memory to save its state for information that is not included in the SPOOL.OUT file 1308.

The SPOOL.OUT 1308 file contains all of the specifications to build a drive with a certain SKU/Revision. This is drive independent because at the moment SPOOL.OUT 1308 is constructed there is no knowledge of the drive geometry.

The file consists of three main parts:

the header a variable number of fixed length partition information records a variable number of fixed length records each of which specify a file to be installed on the target hard drive.

Below is a listing of the Header ExpandedFileHeader structure. All data structures are byte aligned.

| \multicolumn{3}{c}{SPOOL.OUT 1308 Header} | | |
|---|---|---|
| Type | Name | Purpose |
| Float | FHeaderFileCheckVersion | Version of header file info |
| Float | FBldSoftwareVersion | Version of software (obsolete) |
| DWORD | dBomSizeInFiles | Size of total drive image in files |
| DWORD | dBomSizeInBytes | Size of total drive image in bytes |
| DWORD | dBomSizeInMBytes | Size of total drive image in MB |
| DWORD | DBomCurrentPass | Unused |
| DWORD | DSKUCurrentRevision | Unused |
| DWORD | DBomCurrentRevision | Unused |
| DWORD | DMinSystemPartitionSize | Unused |
| Long | LBomStartTime | UNIX time process started |
| Long | LbomEndTime | UNIX time process ended |
| Lont | LbomCopyTime | UNIX time copy ended |
| Long | LbomDiagTime | UNIX time diag loading ended |
| Long | LbomLocalHDTime | Unused |
| Long | LbomBlastTime | UNIX time blasting ended |
| WORD | WBomNumRootEntries | Number of directory entries for root directory of partitions. Not used. |
| BYTE | CBomNumPartitionRecs | Number of partition in drive image |
| BYTE | BOperatingMode | Signals SDS or DSD mode |
| BYTE | BlastDriveType | Unused |
| CHAR[26] | CBomNumber | BOM ID of drive image |
| CHAR[26] | CBomSku | SKU number of master component |
| CHAR[30] | CBomSite | Server machine is connected to |
| CHAR[13] | CbomUnitSN | Unit serial number |
| CHAR[13] | CBomSurrogateSN | Surrogate's Serial number (blank for DSD mode) |
| CHAR[120] | CBomErrorMsg | Used to hold exception error messages |
| CHAR[257] | CBomBootMasterName | Path to MBR for drive image |
| CHAR[7] | CBomErrorCode | Exception number storage area |
| CHAR[5] | CBom Software | Unused |
| CHAR[128] | CBomSetupFileName | Unused |

This header can be found at offset 0 in the SPOOL.OUT 1308 file. Session timing information and data are found there. Most of this information is not used by IMGBLDR 1304—but it allows the next instance of PRBUILD 1302 to pick up where it left off by reloading the LOG structure and creating any needed data areas before spin down.

The field named CBomNumPartitionRecs tells the number of ExpandedPartitionInfo records that follow the header information. These records start immediately after the header and include one record for each partition.

| \multicolumn{3}{c}{SPOOL.OUT 1308 Partition Info} | | |
|---|---|---|
| Type | Name | Purpose |
| DWORD | PiPartSizeMb. | Size in MB of partition. Zero means use all available space. |
| DWORD | PiPartSizeInSectors | Unused |
| DWORD | PiGhostSizeinMBytes | Used to hold sizing information for the Ghost partitions only. |
| DWORD | PiGhostSizeInFiles | Unused |
| DWORD | PiGhostMaxPartSizeMb | Unused |

-continued

SPOOL.OUT 1308 Partition Info

| Type | Name | Purpose |
|---|---|---|
| WORD | PiBootSectorSize | Length in bytes of the boot sector file |
| CHAR | PiDriveOrder | Drive Number partition is on |
| CHAR | PiPartitionOrder | Ordering of the partition on the drive |
| CHAR | PiPartitionType | Type of file system |
| CHAR | PiBootable | Set to 1 when partition should be set active |
| CHAR system | PiGhostType | Type of Ghostfile |
| CHAR[256] | PiSecondartBootSector | NamePath to secondary boot sector - used for loading diagnostics |
| CHAR[256] | PiBootSectorName | Path to partition boot sector |
| CHAR[256] | PiGhostPrimaryPath | Path which, with all sub-directories, is to be loaded into the ghost partition |
| CHAR[256] | PiGhostSecondaryPath | Secondary path--contents of this subdirectory and all of its directories are also added to the ghost partition after the primary path is processed. |

The third part of SPOOL.OUT 1308 is the file specification records—a listing of the ExpandedFileEntryType, structure.

SPOOL.OUT 1308 File List

| Type | Name | Purpose |
|---|---|---|
| CHAR[64] | PszSource | Path on server for data |
| CHAR[256] | PszDestination | Path on drive for data |
| CHAR[14] | PszDosName | Name of file on drive image |
| BYTE[8] | FblobKey | Database key of BLOB |
| DWORD | FunixWriteDate | UNIX form of file write date/time |
| DWORD | FunixLastAccDate | UNIX form of file access date/time |
| DWORD | FunixCreateDate | UNIX form of creation date/time |
| DWORD | Fsize | Size of file in bytes |
| WORD date | Fwrite Date | DOS form of file write |
| WORD | FlastAccDate | DOS form of access date |
| WORD date | FcreateDate | DOS form of creation date |
| BYTE | FcreateTimeMs | Millisecond field of extended file creation date (not used) |
| BYTE | FdestPartition | Partition which will receive the file |
| BYTE | FphysicalOrder | Not used |
| UCHAR[16] | FMD5 | MD5 value for BLOB |
| BYTE | Fattribs | DOS FAT attributes |
| BYTE | FHasLFN | Signal that file has an associated LFN |

The BlobKey is used to locate the file in a hashed index of all files stored in the current image in the image cache. If it is found, a special method in the class DImage (DIMAGE.CPP) will add the file to the drive image on the target using new methods in the classFatFileSystem class which take a buffer as their argument instead of a filename. If not found, the normal path is taken using Process_File() in FillPartition(). In any case, after a file is added to the new target drive, its BlobKey, size and starting sector number position in the target image are logged in the hashed index kept by DImage() and Chash().

Whereas the records used to start at offset 0 in the SPOOL.OUT file 1308, they now start at offset:

(SIZE OF (ExpandedFileHeader)+ ExpandedFileHeader.cBomNumPartitionRecs* SIZEOF(ExpandedPartitionInfo))

GEMINI Module Execution

The execution of PRBUILD 1302 proceeds as follows:
1) If in surrogate download mode.
2) If a drive is not attached, prompt for one to be connected.
3) Turn on power to and wait for drive to spin up.
4) If spin up fails, run SYSCFG. If SYSCFG has already been called three times, fail the drive. If returning in comeback mode, spin down the drive, display pass, and wait until a new one is attached.
5) Connect to SQL Database 914 pointed to by SQL.DAT on the floppy or the SQL environment variable or the SQL value from A:\DSD.TXT if in CCP mode (described below).
6) Create SQL work tables for this connection.
7) If in direct download mode, prompt for a serial number if a valid one does not exist in CMOS. The serial number may also be obtained form the User Input Area in certain situations.
8) If in surrogate download mode, prompt for serial number until one is entered that matches the serial number mask.
9) If a CTO serial number is entered, the program operates in CTO mode (described below).
10) Prompt for SKU number until a valid one is entered. If DSD mode, the SKU may also be obtained form the User Input Area in certain situations.
11) If in CTO or CCP mode, call procedures to build the CTO.TXT software components list and the CTO-HW.TXT hardware components list if valid data is returned.
12) Call a procedure to add the requested SKU onto the database representation of the image.
13) Call a procedure to build the drive in the database worktables.
14) Call a procedure to get global drive information which is saved in the state object.
15) Call a procedure to get partitioning data into the SPOOL.OUT file.
16) If in direct download mode and factory diagnostics are to be placed on the hard drive, WORLD.DAT is updated and Diags information is added to SPOOL.OUT 1308 so that GHOST 1306 is able to create a Diags partition and load the proper files.
17) Query #image to get the list of files to download and save them into the SPOOL.OUT file.
18) Logout from the database.
19) Transfer control to IMGBLDR 1304.

The execution of IMGBLDR 1304 proceeds as follows:
1) Open SPOOL.OUT 1308 and Cworld object created by PRBUILD.
2) Create the skeleton of the drive image in memory.
3) For each partition, create that partition on the external drive and load it with files according to the SPOOL.OUT file 1308.
4) If in surrogate download mode, save the image in the cache if appropriate.
5) If SCANDISK.FLG is set, run an MD5 and Scandisk on first download.

6) Run MD5 and Scandisk on second download.

7) Transfer control to GHOST 1306.

The execution of GHOST 1306 proceeds as follows:

1) Open image list file created by PRBUILD 1302.
2) If software download verification (SDV) is requested, save the current Master Boot Record (MBR) in the correct slot.
3) Create a ghost partition on the end of the drive, load the files found in the V:\NEWSDV network directory, and save all information in memory. If in CCP mode, create the file CCP.TXT in the root of SDV ghost partition to signal SDV.
4) If running in surrogate download mode and there is enough space, save the ghost partition onto the Surrogate hard drive.
5) If diagnostics (DIAGS) are requested, save the current MBR in the correct slot, create a ghost partition on the end of the drive, load the files found in the directory (and all of its subdirectories) stored in the header information of the SPOOL.OUT 1308 into it, and commit the information. If in CTO or CCP modes, copy the file CTOHW.TXT obtained by PRBUILD to the root directory of the diagnostics ghost partition. If in CCP modes, create the file CCP.TXT in the root directory of the ghost partition to signal particular mode to diagnostics. Again, if surrogate mode and there is enough space on the cache drive and in the BOM Index, save the diags ghost partition on the Surrogate hard drive if appropriate.
6) Return control to PRBUILD 1302.

Configure To Order, or CTO mode provides a way to build a unique software configuration for which no standard SKU exists. There are two ways to trigger CTO mode:

User Mode—This mode is intended for use by rework sites and in situations where the batch size is not big enough to justify the overhead of the image-caching scheme.

Automatic Mode—which is triggered by scanning in a serial number with the CTO flag in it (such as a particular alpha numeric character in a given code).

Both modes are identical, except that automatic mode is activated per serial number and will automatically reset back to image caching mode if a normal serial number is scanned. User mode is persistent for that run of the download tools. When automatic CTO mode is triggered, the program will call a stored procedure on the server, which then calls the SFDM database to get a list of components and save them in #sfdm, a temporary table.

After the list of software components is downloaded, a listing of the contents is used to create a copy of the CTO.TXT file on the RAM drive by querying #sfdm. This file is added to the list of files loaded on the drive image and is put into C:\SYSTEM.SAV. If the directory does not exist in the image, it will be created. If there is no user partition in the image, the file creation will never occur and the contents will be lost.

For each component listed in the CTO.TXT file, the server is told to add it into the working set by calling a set of procedures for each component, which is stored #sfdm. This stored procedure updates the image state to contain all files in the component. When all components are added, the program calls another stored procedure to build the full list of files to download.

After the software components list, a second store procedure is called to get a list of hardware components used by diagnostics. If valid data is returned by the stored procedure the text file CTOHW.TXT is created on the RAM drive. This file is copied from RAM drive to the diagnostics ghost partition when is created. This file is also added to the list of files loaded on the drive image and is put into C:\SYSTEM.SAV subdirectory of the primary user partition. If the \SYSTEM.SAV directory does not exist in the image, it will be created. If there is no user partition in the image, the file will only be copied to the diagnostics ghost partition.

The format of CTOHW.TXT does not contain any headers and it lists all the part numbers in one single line. Each part number (6-3) is followed by a comma and the quantity with no spaces in between. A carriage return is added at the end of the line.

A sample of the contents of a CTOHW.TXT file:

123456-001,1,213456-001,1,323456-001,3,623456-001,2

PRBUILD 1302 then queries the #components table to get the size of the files in bytes, and the number of files.

After that, PRBUILD 1302 calls a stored procedure to get the partition information followed by a call to another stored procedure to add the files CTO.TXT and CTOHW.TXT to #image. Pseudocode for the CTO download procedure would resemble the following:

Entry Point for CTO mode

Create temporary SQL tables

Call SFDM communication RPC procedure and wait for results. If an error occurs, abort.

Build CTO.TXT file in the swap area

Call sp_gemini_sfdm_convert RPC procedure which calls sp_gemini_add_component for each entry in the CTO.TXT. Wait for results. If an error occurs, abort with an operator message.

Call xp_Hardware_Components to build CTOHW.TXT file in swap area and add file to component list.

Call sp_-gemini_image_complete RPC procedure to finalize the image and wait for results. If an error occurs, abort.

Call sp_gemini_get_drive_info to build drive partitioning information

Build image list file in RAM by querying #image table and waiting for results. If an error occurs, abort.

Exit CTO specific code and pass control on to IMGBL-DR.EXE

While running in CTO mode, new files will be added to the internal cache drive as the software is running and space will be allocated to them in the index header, but no BOM entry will be made for them. If there are files in the components that overlap (i.e. exist in different components with the same name and destination directory), the program will keep one as described in the sp_gemini_image_complete section above.

When the cache drive reaches a point where it is within a 50 MB of filling, the Surrogate will switch to 'image mode' and complete the current build, wipe the database, and store the full image at the beginning of the cache area as a starting point.

In CTO mode, DIAGS will be cached, but SDV will not (since the SDV software package currently contains the MD5 listing).

Channel Configuration Partner, or CCP mode provides a way for 3d party manufacturers to configure and install software at remote computer manufacturing sites. There are two ways to trigger CCP mode:

User Mode—This mode is intended for use by Channel Configuration sites, which is called by a control program written by the preinstall group.

Automatic Mode—is triggered by detecting a particular alphanumeric character in a particular place in the unit serial number.

When CCP mode is triggered, the program will call a stored procedure on the server, which then calls the SFDM database to get a list of software components and save them in #sfdm, a temporary table. After the list of software components is downloaded, a listing of the contents is used to create a copy of the CTO.TXT file on the RAM drive by querying #sfdm. This file is added to the list of files loaded on the drive image and is put into C:\SYSTEM.SAV. If the directory does not exist in the image, it will be created. If there is no user partition in the image, the file creation will never occur and the contents will be lost.

For each component listed in the CTO.TXT file, the server is told to add it into the working set by calling stored procedures for each component stored in #sfdm. This stored procedure updates the image state to contain all files in the component. When all components are added, the program calls a stored procedure to build the full list of files to download.

After the software components list, a second store procedure is called to get a list of hardware components. If valid data is returned by the stored procedure the text file CTO-HW.TXT is created on the RAM drive. This file is copied from RAM drive to the diagnostics ghost partition when is created. This file is also added to the list of files loaded on the drive image and is put into C:\SYSTEM.SAV subdirectory of the primary user partition. If the \SYSTEM.SAV directory does not exist in the image, it will be created. If there is no user partition in the image, the file will only be copied to the diagnostics ghost partition.

The format of CTOHW.TXT does not contain any headers and it lists all the part numbers in one single line. Each part number (6-3) is followed by a comma and the quantity with no spaces in between. A carriage return is added at the end of the line.

A sample of the contents of a CTOHW.TXT file:
123456-001,1,213456-001,1,323456-001,3,623456-001,2

PRBUILD 1302 then queries the #components table to get the size of the files in bytes, and the number of files.

After that, PRBUILD 1302 calls a stored procedure to get the partition information followed by a call to a second stored procedure to add the files CTO.TXT and CTO-HW.TXT to #image.

A CCP download process would resemble the following:
Entry Point for CCP mode
Initialize RPC and create temporary tables.
Call SFDM communication RPC procedure (sp_gemini_sfdm) and wait for results. If an error occurs, abort.
Build CTO.TXT file in the swap area and add file to component list.
Call RPC procedure sp_gemini_sfdm_convert and wait for results. If an error occurs, abort.
Call xp_Hardware_Components to build CTOHW.TXT file in swap area and add file to component list.
Call sp_gemini_image_complete RPC procedure to finalize the image and wait for results. If an error occurs, abort.
Call sp_gemini_get_drive_info to build drive partitioning information Build image list file in RAM by querying #image procedure and waiting for results. If an error occurs, abort.
Exit CCP specific code and pass control on to IMGBLDR 1304

Surrogate Software Download

The surrogate software assumes nothing about the state of the hard drive. The drive will be completely re-partitioned and re-formatted and files are copied to the drive. Upon completion, the drive will be in a completely different state upon completion than it was in prior to the download. A UIA (User Interface Area) data structure is written to the drive. This contains information about the download such as SKU, BOM, BOM Size, and time information which is used by the data collection teams.

The state of the partitions upon completion is described in Section 0.

The following steps are taken during SQLSDS.EXE:

SQLSDS waits for an external drive to be attached to the drive interface (Step 1602).

SQLSDS then verifies that the application has not changed. When SQLSDS starts it checks and saves the date and time of the executable. Prior to spinning up the target drive it rechecks the date and time of the executable (SQLSDS.EXE) to verify it has not changed. If it has, SQLSDS exits with an error code that signifies to the AUTOEXEC.BAT file that the system needs to reboot.

The Serial number is prompted for (Step 1604). When the operator enters these numbers the Serial Number is validated to ensure it matches the format ANNNAAAAANNN where A is an alphanumeric value and N is a numeric value.

SQLSDS next reads the DIAG.MAP file and determines the location of manufacturing diagnostics files and the size of the manufacturing ghost partition. The parameters supplied are parsed according to the *Ghost Partition Functional Specification.*

The SKU is prompted for and validated to ensure it matches the format AAAAAA-AAA (Step 1606).

Next SQLSDS verifies that the drive type has not changed (Step 1608). If the drive has changed then EISA Config is run (Step 1624). If it is the same the download proceeds.

The SQL database (which is assumed to be existing on the connected NT DASH server) is queried for the BOM information (Step 1610). If this is the same BOM that was downloaded before on this unit the program skips to step 8. Since BOMs never change from inception to expiration the system can safely assume that once the files have been verified they will not need to be checked again.

The records are read into a file in the RAM Drive (Step 1612). As each record is added to the link list SQLSDS verifies that the file exists on the local hard drive only if this is the first pass for this BOM. Since BOMs will never change, there is no point rechecking the cache to see if something is there as it is impossible for it to disappear during the process.

The list of files is sized (Step 1614).

SQLSDS creates partitions on the drive based on the partition sizes provided in the database (Step 1616). As it creates the partition it copies all files for that partition to the target drive. MD5s are checked during the copy only for every $5^{th}$ pass through the system, limiting the liability of a corrupted hard drive (which should be extremely unlikely) to only a maximum of 4 units for rework.

If there are more partitions to be downloaded SQLSDS repeats step 9 for every user partition.

Upon completion of downloading all user partitions, SQLSDS next creates the SDV ghost partition with all files required for the software download verification application which runs after manufacturing diagnostics (Step 1618). In the SDV ghost partition the file SETTIME.SDV is created with a date/time value to be put in the target unit's CMOS by SDV upon completion. This value is the date and time as it existed on the surrogate at the time of the download.

The manufacturing diagnostics ghost partition is created last and filled (Step 1620).

Upon completion a log record is written to the PRISM SQL Server in the table DBO.LOG and the hard drive interface board is powered down, a green Passed screen is displayed, and the pass led is flashed.

At this point the operator is asked to Remove the drive.

When the drive is removed the process starts over (Step 1622).

If at any point in the process a failure occurs a red screen is displayed failing the download. Once an error occurs SDS does not attempt a retry. Instead it will immediately fail the download. When a key is pressed the unit will reboot and the process begins again.

When the unit is booted with the target drive installed it will boot into the manufacturing diagnostics partition.

Direct Software Download (DSD)

The laying of data on the hard drive is similar to that done by SQLSDS. The manufacturing diagnostics will not be placed on the hard drive, however, by SQLDSD. The following steps are taken during SQLDSD.EXE:

Interpret command line options (if any) and set internal flags accordingly (Step 1630).

Find and prepare a scratch drive (a RAM drive) for spooling temp data.

Ask for and verify a SKU number from the operator if the flag /PIA is not specified on the command line (Step 1632). Otherwise the program uses the information currently in the UIA. If the data in the UIA is nonexistent (Step 1634), the program prompts the user (Step 1636). Bad SKU numbers will be trapped by the database. If the /NODATA operator is not specified (Step 1638), data collections will be used to get the SKU number instead. If the SKU is passed in on the command line, it will override all of the above (Step 1640).

Query the radard daemon to get the SKU information from the tables (Step 1642).

The program uses a disk library to clear and format the hard drive of the target unit, setting up the system partition, and any other necessary partitions, according to the parameters passed back from the database (Step 1644).

Loop through the data provided by the SQL server, downloading each file specified to the local disk (Step 1646).

Log information to Data Collection Transaction Processor if /NODATA was not specified (Step 1648).

The DASHFLAGS field of the UIA is set to 0x1 to communicate to SDV that this is a DSD Download.

Disable floppy boot through CMOS (Step 1650).

Reboot machine (running SDV from the hard drive and completing the process) (Step 1652).

Further details of the system context and of options for implementation may be found in MICROSOFT SQL SERVER ADMINISTRATOR'S COMPANION, Ramez Elmasri & Shamkant Navathe, FUNDAMENTALS OF DATABASE SYSTEMS (1989); Martin Gruber, SQL INSTANT REFERENCE (1993); and James L. Johnson, DATABASE MODELS, LANGUAGES, DESIGN (1997); all of which are hereby incorporated by reference.

According to a disclosed class of innovative embodiments, there is provided: a system of software downloading, comprising: a computer network with one or more servers, said server containing software installation configurations; an assembled computer connected to the network and in communication with said server; and a download process executing on said computer which performs the actions of: retrieving an install list from said server; partitioning the hard drive of said assembled computer according to the partitioning information on said install list; retrieving software from said server according to said list; and installing said software onto said hard drive.

According to another disclosed class of innovative embodiments, there is provided: a system of software downloading, comprising: a computer network with at least one server, said server containing software installation configurations; a surrogate computer connected to the network and in communication with said server and containing at least one raw hard drive; and a download process executing on said surrogate machine which performs the actions of: retrieving an install list from said server; partitioning the hard drive of said surrogate machine according to the partitioning information on said install list; retrieving software from said server according to said list; and installing said software onto said hard drive.

According to another disclosed class of innovative embodiments, there is provided: a method for pre-installation of software, said method comprising the actions of: storing software to be pre-installed at computer manufacture on a server; creating respective lists of partitioning information and software to be installed on particular assembled computers; storing said list on said server; and installing software from said server according to said respective lists onto the hard drives of said assembled computers.

According to another disclosed class of innovative embodiments, there is provided: a method for manufacturing computers with pre-installed software, said method comprising the actions of: storing software to be pre-installed at computer manufacture on a server; choosing hard drive partitioning and software to be pre-installed onto an assembled computer with a particular hardware configuration; enforcing partitioning and software choice rules to ensure hardware/software compatibility and proper configuration; creating and storing a list of said partitioning and software choices on said server; and referencing said list to install said stored software from said server according to said list onto said assembled computer.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Further, with a proper multitasking interface, several network connections could be made. This would enable several drives to be prepared, each with different software configurations.

Also, a surrogate machine connected to the server network could contain one or more daughter boards which each act as surrogate machines by controlling multiple hard drives during data-loading.

Several database models exist which utilize different approaches to the organization of data. While the preferred embodiment is implemented in a relational database model, alternatively, the object-oriented model, network model, or another model could be used to store and organize the data.

Additionally, a particular set of tables and data has been used for the organization of data in the relational database. However, data kept in one or more tables could be divided between other tables, used to populate new tables, or condensed into fewer tables or, a greater or lesser number of data attributes can be stored. Further, different primary and/or secondary keys could be used to access the table.

The determination of duplicate data is made by comparing the file size and result of an MD5 hash calculation. However, other more rudimentary methods of duplicate checking can be utilized. For instance, a check incorporating file name, size, and date/time stamp can be utilized.

What is claimed is:

1. A system of software downloading, comprising:
   (a.) a computer network with a server containing software installation configurations;
   (b.) first connections to connect an assembled computer containing a first hard drive to said network and said server;
   (c.) second connections to connect a plurality of hard drives in a surrogate machine to said network and said server; and
   (d.) a download process which can be executed on both said assembled computer and said plurality of hard drives which performs the actions of:
      (i.) retrieving a respective install list from said server;
      (ii.) partitioning ones of said first hard drive and said plurality of hard drives according to the respective partitioning information on said respective install list;
      (iii.) retrieving software from said server according to said respective list; and
      (iv.) installing said software onto respective ones of said first hard drive and said plurality of hard drives.

2. The system of claim 1, wherein said software is installed according to a required order.

3. The system of claim 1, further comprising a second server which maintains said install list.

4. The system of claim 1, further comprising a database which maintains said install list.

5. A system of software downloading, comprising:
   (a.) a computer network with a server, said server containing software installation configurations;
   (b.) a surrogate computer connected to the network and in communication with said server and containing a plurality of raw hard drives, wherein said plurality is greater than 1; and
   (c.) a download process executing on said surrogate machine which performs the actions of:
      (i.) retrieving an install list from said server;
      (ii.) partitioning the hard drive of said surrogate machine according to the partitioning information on said install list;
      (iii.) retrieving software from said server according to said list; and
      (iv.) installing said software onto said plurality of hard drives in parallel.

6. The system of claim 5, wherein said software is installed according to a required order.

7. The system of claim 5, further comprising a second server which maintains said install list.

8. The system of claim 5, further comprising a database which maintains said install list.

9. The system of claim 5, further comprising an assembled computer connected to said network and a download process executing on said assembled computer.

10. A method for pre-installation of software, said method comprising the actions of:
    (a.) storing software to be pre-installed at computer manufacture on a server;
    (b.) creating a plurality of lists of partitioning information and software to be installed on particular respective hard drives;
    (c.) storing said plurality of lists on said server; and
    (d.) installing software from said server according to respective ones of said plurality of lists onto said respective hard drives;
wherein said installing step can selectively install said software as disk images or as files
wherein a plurality of said hard drives are contained in a surrogate machine and said software is installed onto said plurality of hard drives in parallel.

11. The method of claim 10, wherein ones of said hard drives are contained in assembled computers.

12. The method of claim 10, wherein said software is installed according to a required order.

13. The method of claim 10, wherein a second server maintains said install list.

14. The method of claim 10, wherein a database maintains said install list.

15. The method of claim 10, wherein said server and said respective hard drives are connected to a network and said software is installed over said network.

16. The method of claim 10, wherein said software can be simultaneously installed onto a plurality of assembled computers and surrogate machine raw hard drives.

17. A method for manufacturing computers with pre-installed software, said method comprising the actions of:
    (a.) storing software to be pre-installed at computer manufacture on a server;
    (b.) choosing hard drive partitioning and software to be pre-installed onto an assembled computer with a particular hardware configuration;
    (c.) enforcing partitioning and software choice rules to ensure hardware/software compatibility and proper configuration;
    (d.) creating and storing a list of said partitioning and software choices on said server; and
    (e.) referencing said list to install said stored software from said server according to said list onto a hard drive which will be part of said assembled computer.

18. The method of claim 17, wherein said hard drive is installed on a surrogate machine.

19. The method of claim 17, wherein said software is installed according to a required order.

20. The method of claim 17, wherein a second server maintains said install list.

21. The method of claim 17, wherein a database maintains said install list.

22. The method of claim 17, wherein said hard drive is installed on a surrogate machine containing multiple raw hard drives and said software is installed onto all said hard drives.

23. The method of claim 17, wherein said server and said hard drive are connected to a network and said software is installed over said network.

24. The method of claim 17, wherein said software can be simultaneously installed onto a plurality of assembled computers and surrogate machine raw hard drives.

25. The method of claim 17, wherein a structured database maintains said choice rules.

26. The method of claim 17, wherein said choice rules are maintained on a second server.

27. The method of claim 17, wherein said hard drive is installed in said assembled computer.

* * * * *